United States Patent
van den Berg et al.

(10) Patent No.: US 12,373,725 B2
(45) Date of Patent: Jul. 29, 2025

(54) SINGLE-SHOT ERROR MITIGATION FOR CLIFFORD CIRCUITS

(71) Applicant: International Business Machines Corporation, Armonk, NY (US)

(72) Inventors: Ewout van den Berg, Bronxville, NY (US); Sergey Bravyi, Ossining, NY (US); Dmitri Maslov, Great Falls, VA (US); Paul Kristan Temme, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

(21) Appl. No.: 18/327,693

(22) Filed: Jun. 1, 2023

(65) Prior Publication Data

US 2024/0403688 A1     Dec. 5, 2024

(51) Int. Cl.
*H03M 13/00*     (2006.01)
*G06N 10/20*     (2022.01)
*G06N 10/70*     (2022.01)

(52) U.S. Cl.
CPC ............ *G06N 10/70* (2022.01); *G06N 10/20* (2022.01)

(58) Field of Classification Search
CPC ........ G06N 10/70; G06N 10/00; H03M 13/00
See application file for complete search history.

(56) References Cited

U.S. PATENT DOCUMENTS

| | | | |
|---|---|---|---|
| 10,972,133 B2 | 4/2021 | Chamberland et al. | |
| 11,405,056 B2 * | 8/2022 | Hastings | G06N 10/20 |
| 11,410,070 B2 * | 8/2022 | Das | G06F 9/30145 |
| 11,437,995 B1 * | 9/2022 | Haah | G06N 10/00 |
| 11,567,827 B2 * | 1/2023 | Zheng | G06N 10/80 |
| 11,907,808 B2 * | 2/2024 | Schmitz | G06N 10/80 |
| 11,934,920 B2 * | 3/2024 | Ryan-Anderson | G06N 10/40 |

(Continued)

OTHER PUBLICATIONS

Temme, K. et al. "Error mitigation for short-depth quantum circuits." arXiv:1612.02058v3 [quant-ph] Nov. 6, 2017, 15 pages.

(Continued)

*Primary Examiner* — Esaw T Abraham
(74) *Attorney, Agent, or Firm* — Amin, Turocy & Watson, LLP

(57) ABSTRACT

Systems and techniques that facilitate improved single-shot error mitigation for Clifford circuits are provided. For a Clifford circuit, various embodiments described herein can facilitate two-sided or one-sided Pauli checks. In various aspects, left-side Pauli operators of two-sided Pauli checks can be selected randomly without replacement, and right-side Pauli operators of two-sided Pauli checks can be identified via commutation identities respectively relating the Clifford circuit to the left-side Pauli operators. In various instances, Pauli operators of one-sided Pauli checks can be selected via commutation identities respectively relating the Clifford circuit to Z-type Paulis selected randomly without replacement. For either two-sided or one-sided Pauli checks, various embodiments described herein can involve implementation of interleaved SWAP gates, which can allow such two-sided or one-sided Pauli checks to be performed on linear nearest neighbor coupling topologies.

20 Claims, 20 Drawing Sheets

(56) References Cited

U.S. PATENT DOCUMENTS

| | | | |
|---|---|---|---|
| 12,141,658 B2* | 11/2024 | Litinski | G06N 10/40 |
| 2022/0414519 A1* | 12/2022 | McClean | G06N 10/20 |

OTHER PUBLICATIONS

Li, Y. et al. | "Efficient Variational Quantum Simulator Incorporating Active Error Minimization." Physical Review X 7, 021050 (2017), 14 pages.

Koczor B. | "Exponential Error Suppression for Near-Term Quantum Devices." Physical Review X 11, 031057 (2021), 30 pages.

Bonet-Monroig, X. et al. | "Low-cost error mitigation by symmetry verification." arXiv:1807.10050v3 [quant-ph] Jan. 2, 2019, 11 pages.

McArdle, S. et al. | "Error-mitigated digital quantum simulation." arXiv:1807.02467v5 [quant-ph] May 28, 2019, 17 pages.

Shaydulin, R. et al. | "Error Mitigation for Deep Quantum Optimization Circuits by Leveraging Problem Symmetries." arXiv:2106.04410v2 [quant-ph] Jun. 9, 2021, 10 pages.

Peruzzo, A. et al. | "A variational eigenvalue solver on a photonic quantum processor." Nature Communications, Received Dec. 9, 2013 | Accepted May 27, 2014 | Published Jul. 23, 2014, 7 pages.

Kandala, A. et al. | "Hardware-efficient variational quantum eigensolver for small molecules and quantum magnets." Nature 549, 242-246 (2017). https://doi.org/10.1038/nature23879, 5 Pages.

Farhi, Ed. et al. | "A Quantum Approximate Optimization Algorithm." arXiv:1411.4028v1 [quant-ph] Nov. 14, 2014, 16 pages.

Aaronson, Sc. et al. | "Complexity-Theoretic Foundations of Quantum Supremacy Experiments." arXiv:1612.05903v2 [quant-ph] Dec. 26, 2016, 66 pages.

Aaronson, Sc. et al. | "Improved Simulation of Stabilizer Circuits." arXiv:quant-ph/0406196v5 Jun. 18, 2008, 15 pages.

Farhi, Ed. et al. | "Quantum Supremacy through the Quantum Approximate Optimization Algorithm." arXiv:1602.07674v2 [quant-ph] Oct. 21, 2019, 23 pages.

Bravyi, S. et al. | "Classical algorithms for Forrelation." arXiv:2102.06963v2 [quant-ph] Oct. 31, 2021, 53 pages.

Bravyi, S. et al. | "Classical algorithms for quantum mean values." arXiv:1909.11485v1 [quant-ph] Sep. 25, 2019, 29 pages.

Terhal B. M. et al. | "Adaptive Quantum Computation, Constant Depth Quantum Circuits and Arthur-Merlin Games." arXiv:quant-ph/0205133v6 Mar. 11, 2004, 13 pages.

Bremner, M. J. et al. | "Average-Case Complexity Versus Approximate Simulation of Commuting Quantum Computations." Phys. Rev. Lett. 117, 080501—Published Aug. 18, 2016, 5 pages.

Aaronson, Sc. | "Shadow Tomography of Quantum States." SIAM Journal on Computing, vol. 49, Iss. 5 (2020) 10.1137/18M120275X, 27 pages.

Huang, H.-Y. et al. | "Predicting Many Properties of a Quantum System from Very Few Measurements." arXiv:2002.08953v2 [quant-ph] Apr. 22, 2020, 40 pages.

Magesan, E. et l. | "Robust randomized benchmarking of quantum processes." arXiv:1009.3639v1 [quant-ph] Sep. 19, 2010, 5 pages.

Knill, E. et al. | "Randomized benchmarking of quantum gates." Physical Review A 77, 012307 (2008), 7 pages.

Bravyi, S. et al. | "Quantum advantage with shallow circuits." Science, Oct. 19, 2018, vol. 362, Issue 6412, pp. 308-311, DOI: 10.1126/science.aar3106, 4 pages.

Pastawski, F. et al. | "Holographic quantum error-correcting codes: Toy models for the bulk/boundary correspondence." arXiv:1503.06237v2 [hep-th] Jul. 22, 2015, 65 pages.

Bravyi, S. et al. | "Clifford Circuit Optimization with Templates and Symbolic Pauli Gates." arXiv:2105.02291v2 [quant-ph] Nov. 11, 2021, 16 pages.

Bravyi, S. Et al. | "6-qubit Optimal Clifford Circuits." arXiv:2012.06074v2 [quant-ph] Aug. 24, 2022, 23 pages.

Bouland, Ad. et al. | "Complexity Classification of Conjugated Clifford Circuits." arXiv:1709.01805v2 [quant-ph] May 29, 2018, 31 pages.

Bravyi, S. et al. | "Improved Classical Simulation of Quantum Circuits Dominated by Clifford Gates." Phys. Rev. Lett. 116, 250501—Published Jun. 20, 2016, 5 pages.

Zhou, H. et al. | "Quantum Circuits for Dynamic Runtime Assertions in Quantum Computation." IEEE Computer Architecture Letters, vol. 18, No. 2, Jul.-Dec. 2019, 4 pages.

Aaronson, Sc. et al. | "Improved Simulation of Stabilizer Circuits." Phys. Rev. A 70, 052328—Published Nov. 30, 2004, 14 pages.

Brun, T. et al. | "Correcting quantum errors with entanglement", Science 314, 436-439 (2006), 5 pages.

Chancellor, N. et al. | "Graphical Structures for Design and Verification of Quantum Error Correction." arXiv:1611.08012v3 [quant-ph] Jan. 12, 2018, 61 pages.

Roffe J. et al. | "Protecting quantum memories using coherent parity check codes." Quantum Sci. Technol. 3 035010, Published Jun. 6, 2018, 28 pages.

Roffe, J. | "The Coherent Parity Check Framework for Quantum Error Correction", PHD thesis, Apr. 29, 2019, http://etheses.dur.ac.uk/13055/1/roffe_thesis_final.pdf, 165 pages.

Chao, R. et al. | "Quantum Error Correction with Only Two Extra Qubits." Phys. Rev. Lett. 121, 050502 (2018), 5 pages.

Chao, R. et al. | "Fault-tolerant quantum computation with few qubits." Quantum Information, vol. 4, 42 (2018), 8 pages.

Gonzales, A. et al. | "Quantum Error Mitigation by Pauli Check Sandwiching," arXiv:2206.00215v1 [quant-ph] Jun. 1, 2022, 14 pages.

Bonet-Monroig, X. et al. | "Nearly Optimal Measurement Scheduling for Partial Tomography of Quantum States," Physical Review X 10.3 (2020): 031064, 12 pages.

Chamberland, Ch. et al. | "Topological and Subsystem Codes on Low-Degree Graphs with Flag Qubits," Physical Review X 10.1 (2020): 011022, 19 pages.

Huggins, W et al. | "Virtual Distillation for Quantum Error Mitigation." arXiv:2011.07064v3 [quant-ph] Aug. 2, 2021, 26 pages.

Debroy, M. D. et al. | "Extended flag gadgets for low-overhead circuit verification." arXiv:2009.07752v2 [quant-ph] Jan. 25, 2021, 7 pages.

Bravyi et al., "Hybrid quantum-classical algorithms for approximate graph coloring", Quantum, 6:678, 2022, 27 pages.

Kandala et al., "Error Mitigation Extends the Computational Reach of a Noisy Quantum Processor", Nature, vol. 567, Mar. 28, 2019, 11 pages.

Kim et al., "Scalable Error Mitigation for Noisy Quantum Circuits Produces Competitive Expectation Values", IBM Quantam, Aug. 20, 2021, 16 pages.

Motta et al., "Determining Eigenstates and Thermal States on a Quantum Computer Using Quantum Imaginary Time Evolution", Nature Physics, Feb. 16, 2020, 18 pages.

Schuld et al., "Quantum Machine Learning in Feature Hilbert Spaces", Physical Review, Mar. 19, 2018, 6 pages.

Havlíek et al., "Supervised Learning with Quantum Enhanced Feature Spaces", Nature, vol. 567, Mar. 13, 2019, pp. 209-212, 4 pages.

Abrams, Daniel S., "Quantum Algorithm Providing Exponential Speed Increase for Finding Eigenvalues and Eigenvectors", Physical Review Letter, vol. 83, No. 24, Dec. 13, 1999, 4 pages.

Shor, Peter W., "Polynomial-Time Algorithms for Prime Factorization and Discrete Logarithms on a Quantum Computer", SIAM Review, vol. 41, No. 2, 303-332 , Mar. 14, 1999, 30 pages.

Grover et al., "Quantum Mechanics Helps in Searching for a Needle in a Haystack", Physical Review Letters, vol. 79, No. 2, Jul. 14, 1997, 4 pages.

Jurcevic et al., "Demonstration of Quantum vol. 64 on a Superconducting Quantum Computing System", Quantum Science and Technology, vol. 6, No. 025020, Mar. 17, 2021, 11 pages.

Layden et al., "Quantum-enhanced Markov Chain Monte Carlo", IBM Quantum, Mar. 23, 2022, 49 pages.

Coble et al., "Quasi-polynomial time approximation of output probabilities of geometricallylocal, shallow quantum circuits", IEEE 62nd Annual Symposium on Foundations of Computer Science, 2021, 12 pages.

(56) References Cited

OTHER PUBLICATIONS

Dontha et al., "Approximating Output Probabilities of Shallow Quantum Circuits Which are Geometrically-local in Any Fixed Dimension", Quantam Physics, arXiv:2202.08349v1, Feb. 16, 2022, 18 pages.
Bremner et al.,"Achieving Quantum Supremacy with Sparse and Noisy Commuting Quantum Computations", Quantum, Apr. 21, 2017, 23 pages.
Wang et al.,"Quantum Approximate Optimization Algorithm for MaxCut: A fermionic View", Physical Review A, vol. 97, No. 022304, Feb. 5, 2018, 11 pages.
Bravyi et al., "Obstacles to Variational Quantum Optimization from Symmetry Protection", Physical Review Letters, vol. 125, No. 260505, Dec. 13, 2020, 6 pages.
Endo et al., "Hybrid quantum-classical algorithms and quantum error mitigation", Journal of the Physical Society of Japan, 90(3):032001, 2021, 33 pages.
Gunthar et al., "Improving Readout in Quantum Simulations with Repetition Codes", Quantum Science and Technology, vol. 7, No. 015009, Nov. 29, 2021, 20 pages.
Hicks et al., "Active Readout-error Mitigation", Quantum Physics, Sep. 7, 2022, 15 pages.
Bravyi et al., "Hadamard-Free Circuits Expose the Structure of the Clifford Group", IEEE Transactions on Information Theory, vol. 67, No. 7, Jul. 2021, 18 pages.
Maslov et al., "CNOT Circuits Need Little Help to Implement arbitary Hadamard-free Clifford Transformations They Generate", IBM Quantum, Jan. 24, 2023, 13 pages.
Viola et al., "Dynamical Suppression of Decoherence in Two-state Quantum Systems", Physical Review A, vol. 58, No. 4 , Oct. 1998, 12 pages.
Ezzell et al., "Dynamical Decoupling for Superconducting qubits: A Performance Survey", Quantum Physics, Jul. 11, 2022, 22 pages.
Sarvepalli et al., Asymmetric Quantum Codes: Constructions, Bounds and Performance, Proceedings of The Royal Society A, vol. 465, Mar. 4, 2009, pp. 1645-1672, 28 pages.
Maciejewski et al., "Mitigation of Readout Noise in Near-term Quantum Devices by Classical Post-processing Based on Detector Tomography", Quantum, Mar. 25, 2020, 23 pages.
Raussendorf et al., "A One-way Quantum Computer", Physical Review Letters, vol. 86, No. 22, 2001, 4 pages.
Bravyi et al., "Trading Classical and Quantum Computational Resources", Physical Review, 2016, 14 pages.
"Qiskit: An Open-source Framework for Quantum Computing", "What Can Qiskit Do." On-line publication, downloaded Jul. 24, 2023, 4 pages.
Berg et al., "Probabilistic error cancellation with sparse Pauli-Lindblad models on noisy quantum processors", Jun. 23, 2022, 29 pages.
Roffe, J. et al., "Protecting quantum memories using coherent parity check codes", arXiv: 1709.01866v3, May 22, 2018, 42 pages.

* cited by examiner

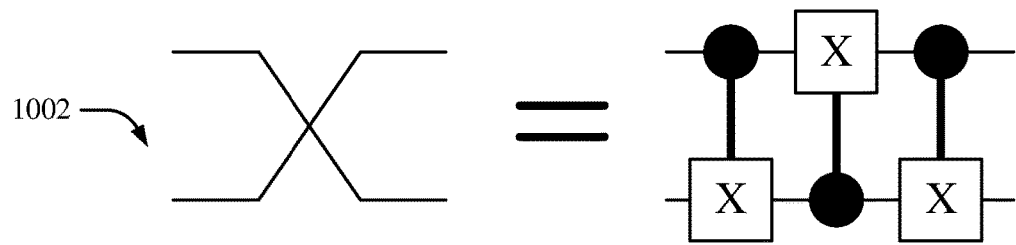
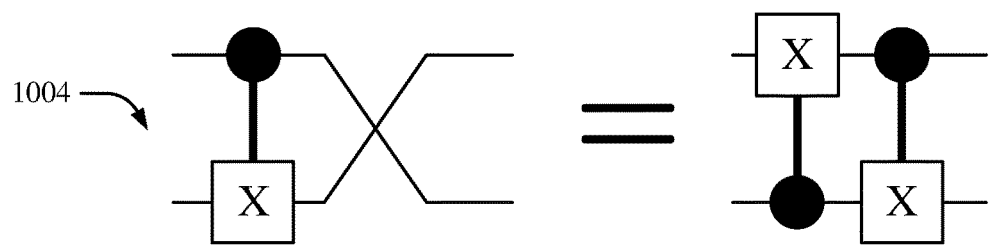
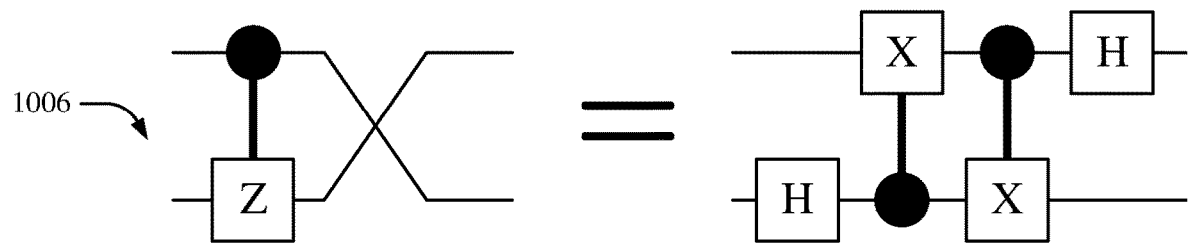
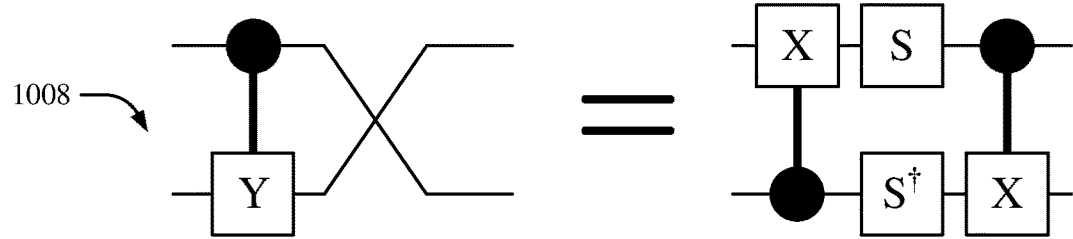
FIG. 10

SINGLE-SHOT ERROR MITIGATION FOR CLIFFORD CIRCUITS

BACKGROUND

The subject disclosure relates to quantum error mitigation, and more specifically to improved single-shot error mitigation for Clifford circuits.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, methods, or apparatuses that can facilitate improved single-shot error mitigation for Clifford circuits are described.

According to one or more embodiments, a system is provided. In various aspects, the system can comprise a processor that can execute computer-executable instructions stored in a non-transitory computer-readable memory. In various instances, such execution can cause the processor to facilitate various operations. In various cases, such operations can comprise performing a Clifford circuit on a set of data qubits. In various aspects, such operations can further comprise detecting an error in performance of the Clifford circuit by measuring a set of check qubits using nested two-sided Pauli checks that sandwich the Clifford circuit. In various instances, left-side Pauli operators of the nested two-sided Pauli checks can be selected randomly without replacement. In various cases, right-side Pauli operators of the nested two-sided Pauli checks can be selected based on a commutation circuit identity relating respective ones of the left-side Pauli operators to the Clifford circuit.

According to one or more embodiments, a system is provided. In various aspects, the system can comprise a processor that can execute computer-executable instructions stored in a non-transitory computer-readable memory. In various instances, such execution can cause the processor to facilitate various operations. In various cases, such operations can comprise performing a Clifford circuit on a set of data qubits. In various aspects, such operations can further comprise detecting an error in performance of the Clifford circuit by measuring a set of check qubits using nested one-sided Pauli checks that are prior to the Clifford circuit. In various instances, the nested one-sided Pauli checks can be selected based on a commutation circuit identity relating the Clifford circuit to Z-type Pauli operators that are selected randomly without replacement.

In various aspects, the above-described systems can be implemented as computer-implemented methods or as computer program products.

DESCRIPTION OF THE DRAWINGS

FIG. 10 illustrates various quantum circuit equivalences that can be applied to interleaved SWAP gates in accordance with one or more embodiments described herein.

DETAILED DESCRIPTION

Figure 1:
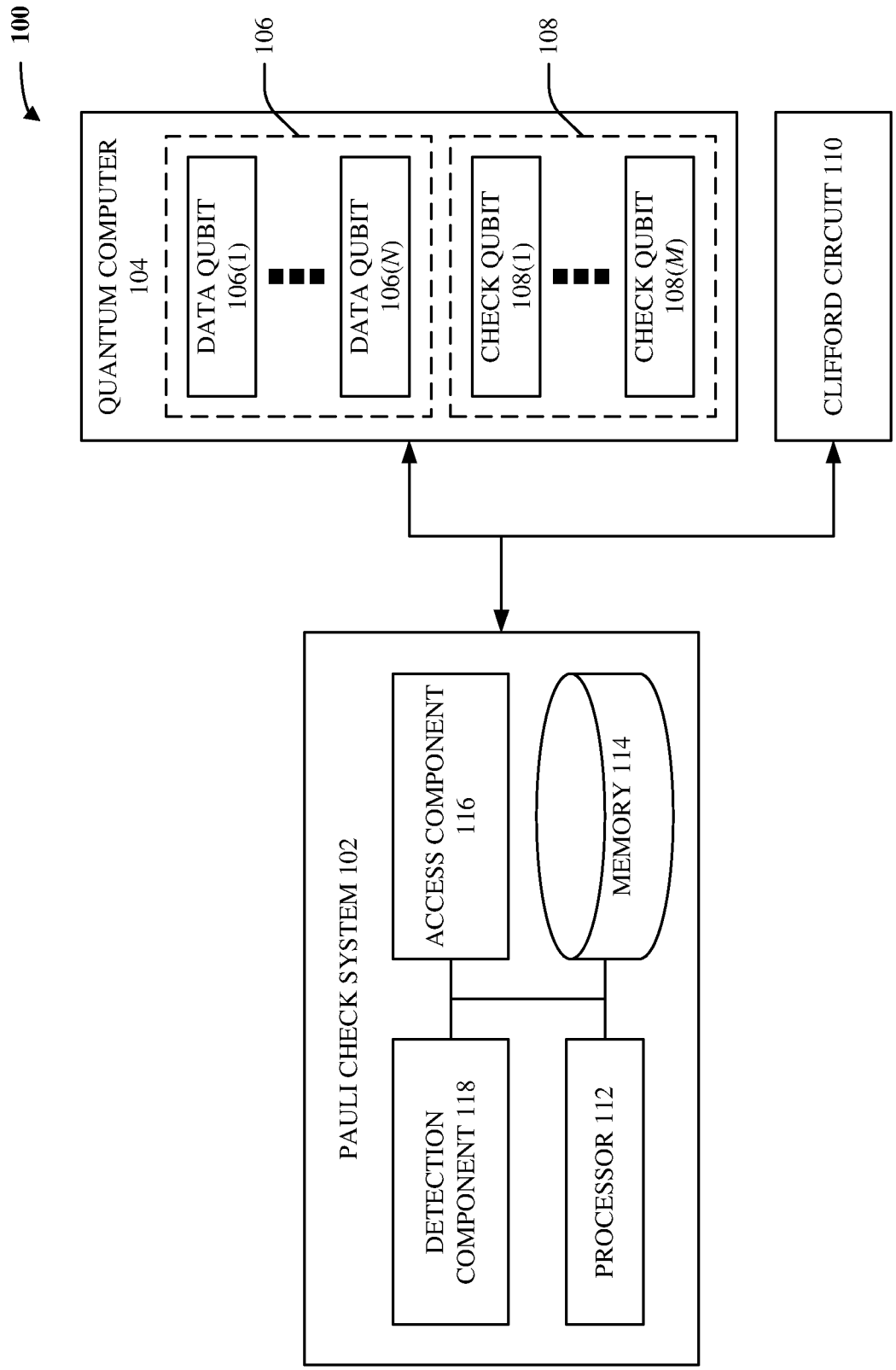
FIG. 1 illustrates a block diagram of an example, non-limiting system that facilitates improved single-shot error mitigation for Clifford circuits in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A quantum computer can be any suitable device that utilizes a qubit lattice (e.g., a plurality of superconducting qubits fabricated on one or more quantum substrates and exhibiting any suitable connection topology) for information processing. A quantum circuit can be a sequence of any suitable number of parallel or series quantum gates that can be executed on a quantum computer. A quantum gate can be a basic component of a quantum circuit that can change, alter, or otherwise affect the state of a qubit. As some non-limiting examples, a quantum gate can be any suitable single-qubit gate (e.g., Pauli-X gates, Pauli-Y gates, Pauli-Z gates, Phase gates, Rotation gates, Hadamard gates) or any suitable entangling or two-qubit gate (e.g., Controlled-Not gates, Controlled-Phase gates). Quantum gates can be combined in series via matrix multiplication or in parallel via tensor products. A Clifford circuit can be any quantum circuit that can be expressed using only Clifford gates; that is, that can be expressed using only Hadamard gates, Phase gates, or Controlled-Not gates. A quantum circuit can be considered as having a Clifford depth d, for any suitable positive integer d, if that quantum circuit can be represented as a composition of d Clifford circuits separated by arbitrary layers of single-qubit, non-Clifford gates.

Quantum error mitigation (QEM) can be considered as a set of tools or strategies for improving reliability of quantum circuits executed on noisy quantum hardware. Unlike quantum error correction (QEC), QEM can involve minor overhead in terms of ancillary qubits or circuit depth. Non-limiting examples of QEM can include Zero Noise Extrapolation, Probabilistic Error Cancellation, Virtual Entanglement Distillation, and Symmetry Verification.

Unfortunately, the vast majority of QEM techniques are applicable only to quantum algorithms that utilize expected value readouts (e.g., to algorithms that can access the output of a quantum circuit through expected values $\langle \psi|O|\psi \rangle$, where $|\psi\rangle$ is the output state of the quantum circuit, and where O is some observable such as a Pauli operator). Such vast majority of QEM techniques are inapplicable to quantum algorithms that instead utilize single-shot readouts. That is, such vast majority of QEM techniques cannot mitigate errors in quantum algorithms that generate samples from the output probability distribution of a quantum circuit (e.g., that sample a bit string x from the probability distribution $|\langle x|\psi \rangle|^2$). This inapplicability to single-shot algorithms can be considered as problematic, since quantum algorithms that utilize single-shot readouts (e.g., Shor's Factoring Algorithm, Grover's Search Algorithm, Quantum Approximate Optimization Algorithm, Quantum Volume Algorithm, Quantum-Enhanced Markov Chain Monte Carlo Algorithm) can be considered as more computationally powerful than quantum algorithms that instead utilize expected value readouts (e.g., Variational Quantum Eigensolver).

One QEM technique that is applicable to quantum algorithms that utilize single-shot readouts is two-sided Pauli checking. Two-sided Pauli checking enables single-shot error mitigation for arbitrary circuits composed of Clifford gates. In particular, for any given Clifford circuit, a two-sided Pauli check detects errors in that given Clifford circuit by verifying, on an ancillary qubit, commutation rules (e.g., commutative identities or equivalences) between that given Clifford circuit and a pair of Pauli operators that are controlled by the ancillary qubit and that sandwich (e.g., that flank, that are on both left and right sides of) that given Clifford circuit. Due to such sandwiching, a two-sided Pauli check can be referred to as a Pauli sandwich. To increase the likelihood of detecting an error, multiple two-sided Pauli checks, each controlled by a respective ancillary qubit, can be nested together around the given Clifford circuit. For case of explanation, the qubits on which the given Clifford circuit and the controlled Pauli operators operate can be referred to as data qubits, whereas the ancillary qubits that control the controlled Pauli operators can instead be referred to as check qubits.

Although two-sided Pauli checking can enable single-shot error mitigation and thus can be considered as advantageous over the vast majority of QEM techniques, the inventors of various embodiments described herein realized that two-sided Pauli checking can nevertheless be improved. Accordingly, various embodiments described herein can be considered as technical improvements to two-sided Pauli checking.

In various aspects, the present inventors realized that error mitigation of existing techniques for facilitating two-sided Pauli checking can be significantly increased by random selection without replacement. More specifically, for any given number of nested two-sided Pauli checks that are applied to an n-qubit Clifford circuit, for any suitable positive integer n, the left-side Pauli operators of those nested two-sided Pauli checks can be randomly chosen without replacement from the set of all n-qubit, non-identity Pauli operators, and the respectively corresponding right-side Pauli operators can be identified via commutation rules. As the present inventors recognized, such random selection without replacement can cause any given two-sided Pauli check to be able to detect about half of whatever errors might occur within the Clifford circuit and within whichever other two-sided Pauli checks (if any) are nested inside the given two-sided Pauli check. Accordingly, if m nested two-sided Pauli checks are randomly selected without replacement, for any suitable positive integer m, then the prevalence of errors in the Clifford circuit can be mitigated to about a factor of $2^{-m}$. Note that existing techniques do not provide such a strategy regarding how to select which two-sided Pauli checks should be implemented.

Furthermore, in various instances, the present inventors realized that hardware restrictions of existing techniques for facilitating two-sided Pauli checking can be significantly relaxed by interleaved SWAP gates. In particular, existing techniques for facilitating two-sided Pauli checks generally utilize an all-to-all connection topology between check qubits and data qubits. In other words, such existing techniques require that each data qubit be physically coupled to each check qubit, so that each two-sided Pauli check can be controlled by a respective check qubit. Unfortunately, such an all-to-all connection topology can be considered as a complicated and difficult hardware architecture to implement, and such complication and difficulty can become exacerbated as the data qubits and check qubits grow in number. The present inventors realized that such all-to-all connection topology can be eschewed if interleaved SWAP gates are implemented. More specifically, each n-qubit controlled Pauli operator of a two-sided Pauli check can be considered as a tensor product of n controlled Pauli gates, and each of such controlled Pauli gates can be followed by a respective SWAP gate. In other words, SWAP gates can be interleaved, interspersed, or otherwise interdigitated throughout the two-sided Pauli check. As described herein, when implemented on a linear nearest neighbor connection topology, such interleaved SWAP gates can cause the logical state of each data qubit and the logical state of each check qubit to, at some point, be coupled together. In other words, interleaved SWAP gates as described herein can enable two-sided Pauli checks to be performed on a relaxed, easy-to-implement hardware architecture (e.g., linear nearest neighbor connection topology) rather than on a complicated, difficult-to-implement hardware architecture (e.g., all-to-all connection topology).

Moreover, note that interleaved SWAP gates as described herein can be advantageous over other possible arrangements of SWAP gates for implementing two-sided Pauli checks. For example, for any given connection topology and for any given controlled Pauli gate, SWAP gates can be executed until the target qubit and the control qubit of that given controlled Pauli gate become coupled neighbors. At such point, the given controlled Pauli gate can be executed, and even more SWAP gates be executed so as to return the qubit connectivity back to its original ordering. This process can be repeated for any suitable number of controlled Pauli gates. Such utilization of SWAP gates can allow two-sided Pauli checks to be performed in the absence of an all-to-all connection topology. However, such utilization of SWAP gates can require significantly more swapping and significantly more Controlled-Not gates as compared to interleaving SWAP gates as described herein.

Further still, in various cases, the present inventors realized that quantum computational overhead associated with existing techniques for facilitating two-sided Pauli checking can be significantly reduced via one-sided Pauli checking. More specifically, for any given number of nested two-sided Pauli checks that are applied to an n-qubit Clifford circuit, the right-side Pauli operators of those nested two-sided Pauli checks can be randomly chosen without replacement from the set of all n-qubit, non-identity, Z-type Pauli operators (e.g., excluding Pauli-X gates and Pauli-Y gates), and the respectively corresponding left-side Pauli operators can be identified via commutation rules. Moreover, for each given right-side Pauli operator, a respective pair of Hadamard gates can be inserted onto whichever check qubit controls that given right-side Pauli operator and prior to each component of that given right-side Pauli operator. With such inserted Hadamard pairs, the components of the right-side Pauli operators can each amount to either identity gates or to Controlled-Not gates that target respective check qubits. Accordingly, the right-side Pauli operators can, in the absence of errors, have no effect on the quantum states of the data qubits and can instead affect only the quantum states of the check qubits. Moreover, identity gates and Controlled-Not gates can be easily implemented classically (e.g., via Boolean operations such as Exclusive-OR). Thus, in cases where the data qubits are measured in the Z-basis, the left-side Pauli operators can be maintained, whereas the right-side Pauli operators can be omitted (hence the term "one-sided") and easily performed classically in post-processing. In this way, a quantum computational overhead of two-sided Pauli checks can be reduced (e.g., can be nearly cut in half).

Various embodiments described herein can be considered as a computerized tool (e.g., any suitable combination of computer-executable hardware or computer-executable software) that can facilitate improved single-shot error mitigation for Clifford circuits. In various aspects, such a computerized tool can comprise an access component and a detection component.

In various embodiments, there can be a quantum computer. In various aspects, the quantum computer can comprise any suitable number of qubits. In various instances, such qubits can exhibit any suitable structures, constructions, or architectures (e.g., can be superconducting qubits, spin qubits, or quantum dots). In various cases, some of such qubits can be considered or otherwise referred to as data qubits, and others of such qubits can be considered or otherwise referred to as check qubits. In various aspects, the data qubits and check qubits of the quantum computer can be arranged or connected according to any suitable coupling topology.

In various instances, there can be a Clifford circuit. In various cases, the Clifford circuit can be configured to operate on the data qubits of the quantum computer.

In various aspects, it can be desired to execute, in single-shot noise mitigated fashion, the Clifford circuit on the data qubits of the quantum computer. As described herein, the computerized tool can facilitate such execution.

In various embodiments, the access component of the computerized tool can electronically access, via any suitable wired or wireless electronic connections, the quantum computer. In various instances, the access component can further access or otherwise receive, retrieve, or import from any suitable source the Clifford circuit. For example, the access component can obtain the Clifford circuit from any suitable centralized or decentralized data structure (e.g., graph data structure, relational data structure, hybrid data structure), whether remote from or local to the access component. In any case, the access component can access the quantum computer or the Clifford circuit, such that other components of the computerized tool can electronically interact with (e.g., power-up, power-down, initialize, control) the quantum computer or can electronically interact with (e.g., read, write, edit, copy, manipulate, execute) the Clifford circuit.

In various embodiments, the detection component of the computerized tool can electronically detect an error of the Clifford circuit, by leveraging nested, randomized two-sided Pauli checks. More specifically, a randomized two-sided Pauli check can include a left-side Pauli operator and a right-side Pauli operator, which can both operate on the data qubits of the quantum computer, which can sandwich the Clifford circuit, and which can sandwich one or more other randomized two-sided Pauli checks (hence the term "nested"). In various aspects, the left-side Pauli operator can be randomly selected without replacement (hence the term "randomized") from the set of all non-identity Pauli operators that can operate on the data qubits, and the right-side Pauli operator can be accordingly identified via any suitable commutation rule that relates the randomly-selected left-side Pauli operator to the Clifford circuit. In various instances, both the left-side Pauli operator and the right-side Pauli operator can be controlled by a respective or unique one of the check qubits of the quantum computer. In various cases, the detection component can initialize the data qubits and the check qubits in any suitable fashion (e.g., all initialized to $|0\rangle$ ) and can execute the Clifford circuit and the nested, randomized two-sided Pauli checks on the quantum computer. After such execution, the detection component can measure, in any suitable basis (e.g., the X-basis) the quantum states of the check qubits and of the data qubits.

In various aspects, the measured states of the check qubits can be considered as indicating whether or not an error was detected within the Clifford circuit. For example, if each of the measured states of the check qubits is $|0\rangle$, then the detection component can conclude that no error was detected in the Clifford circuit (e.g., can conclude that either no error occurred in the Clifford circuit or that an undetected error occurred in the Clifford circuit). On the other hand, if at least one of the measured states of the check qubits is $|1\rangle$, then the detection component can conclude that an error was detected in the Clifford circuit. In such case, the detection component can reinitialize the data qubits and the check qubits and can re-execute the Clifford circuit and the nested, randomized two-sided Pauli checks until all of the measured states of the check qubits are |0⟩. In other words, the detection component can post-select on the check qubits all being |0⟩.

Due to being randomly selected without replacement, each particular randomized two-sided Pauli check can be considered as being able to detect about half of whatever errors (e.g., Pauli errors) might occur in the Clifford circuit and in whatever other randomized two-sided Pauli checks are nested within that particular randomized two-sided Pauli check. In other words, each additional randomized two-sided Pauli check can be considered as reducing the proportion of undetected errors that might occur in the Clifford circuit by an additional factor of ½, regardless of the particular form of the Clifford circuit. In still other words, and as the present inventors experimentally verified, random selection without replacement can significantly reduce the likelihood that a non-identity error affects the Clifford circuit yet goes undetected by the nested, randomized two-sided Pauli checks, and such error reduction applies no matter which specific Clifford gates are implemented in the Clifford circuit and no matter how those specific Clifford gates are arranged or ordered. So, random selection without replacement can be considered as a generalizable, and thus advantageous, strategy for selecting which specific two-sided Pauli checks should be implemented in conjunction with any Clifford circuit. Contrast this with existing techniques, which provide no strategy at all for selecting two-sided Pauli checks or which instead provide only context-dependent strategies that are not applicable across all Clifford circuits.

In various embodiments, the detection component can implement the nested, randomized two-sided Pauli checks if the check qubits and the data qubits are arranged in an all-to-all coupling topology (e.g., such that each data qubit can be coupled to each check qubit). After all, each randomized two-sided Pauli check can operate on the data qubits and can be controlled by a respective check qubit. However, such an all-to-all coupling topology can be rendered unnecessary via the implementation of interleaved SWAP gates. In particular, the detection component can, in various aspects, insert the interleaved SWAP gates into the nested, randomized two-sided Pauli checks, and this can enable the nested, randomized two-sided Pauli checks to be implemented with a linear nearest neighbor coupling topology instead of with an all-to-all coupling topology.

In particular, the check qubits and data qubits can be connected in a linear nearest neighbor coupling topology, such that the check qubits are clustered at a first end of such linear topology, and such that the data qubits are clustered at a second end of such linear topology. Thus, there can be one check qubit and one data qubit that are initially coupled together (e.g., that are initially nearest neighbors). In various aspects, each Pauli operator of the nested, randomized two-sided Pauli checks can be considered as being made up of multiple controlled Pauli gates. In various instances, the detection component can insert a respective SWAP gate after each of such controlled Pauli gates. Accordingly, for any data qubit that is currently coupled to a check qubit, a respective controlled Pauli gate can be implemented, and a respective SWAP gate following that respective controlled Pauli gate can be considered as updating or altering the qubit ordering so that one or more other data qubits are now coupled to one or more other check qubits (e.g., so that one or more next controlled Pauli gates can be implemented). In this way, such SWAP gates, which can be considered as being interspersed, interdigitated, or otherwise interleaved throughout the nested, randomized two-sided Pauli checks, can cause each data qubit to, at some point, become a nearest neighbor of each check qubit. Thus, the nested, randomized two-sided Pauli checks can be implemented, notwithstanding the absence of an all-to-all connection topology. In other words, the interleaved SWAP gates can be considered as enabling a linear nearest neighbor coupling topology to mimic an all-to-all coupling topology. Contrast this with existing techniques, which often rely upon all-to-all coupling topologies to implement two-sided Pauli checks.

In various embodiments, the detection component can reduce a quantum computational overhead associated with detecting errors in the Clifford circuit, by implementing nested, randomized one-sided Pauli checks instead of the nested, randomized two-sided Pauli checks. In particular, a randomized one-sided Pauli check can conceptually begin as a randomized two-sided Pauli check. Rather than randomly selecting the left-side Pauli operators and identifying the right-side Pauli operators via commutation relations, the right-side Pauli operators can instead be randomly selected without replacement (hence the term "randomized") from the set of all non-identity, Z-type Pauli operators that can operate on the data qubits, and the left-side Pauli operators can be accordingly identified via commutation relations. In various instances, respective pairs of Hadamard gates can be inserted onto the check qubits and prior to each controlled Pauli gate of the right-side Pauli operators. With such inserted Hadamard pairs, each controlled Pauli gate of the right-side Pauli operators can be equivalent to either identity gates or a Controlled-Not gate that targets a respective check qubit. Note that such identity gates can (ideally) refrain from affecting the quantum states of any qubits of the quantum computer. Furthermore, note that such Controlled-Not gates can (ideally) refrain from affecting the quantum states of the data qubits. Further still, note that, although such Controlled-Not gates can affect the quantum states of the check qubits, such Controlled-Not gates can be equivalent to applying classical Boolean operations (e.g., Exclusive-OR) to the quantum states of the check qubits. Accordingly, the left-side Pauli operators can be maintained or preserved, and the right-side Pauli operators (and their corresponding inserted Hadamard pairs) can be omitted and classically performed in post-processing. In this way, a quantum computational overhead associated with detecting errors in the Clifford circuit can be significantly reduced (e.g., randomized one-sided Pauli checking can be performed with about half of the quantum gates as randomized two-sided Pauli checking).

Various embodiments described herein can be employed to use hardware or software to solve problems that are highly technical in nature (e.g., to facilitate improved single-shot error mitigation for Clifford circuits), that are not abstract and that cannot be performed as a set of mental acts by a human. Further, some of the processes performed can be performed by a specialized computer (e.g., quantum computers comprising tangible qubits that can execute or implement quantum circuits). In various aspects, some defined tasks associated with various embodiments described herein can include: accessing, by a device operatively coupled to a processor, a Clifford circuit that operates on a set of data qubits; and detecting, by the device, an error of the Clifford circuit by measuring a set of check qubits that respectively control, on the set of data qubits, nested two-sided Pauli checks that sandwich the Clifford circuit, wherein left-side Pauli operators of the nested two-sided Pauli checks are selected randomly without replacement. In various cases, the set of data qubits and the set of check qubits can be arranged in a linear nearest neighbor coupling topology, and the nested two-sided Pauli checks can contain interleaved SWAP gates that can cause the linear nearest neighbor coupling topology to mimic an all-to-all coupling topology. In various instances, other defined tasks associated with various embodiments described herein can include: accessing, by a device operatively coupled to a processor, a Clifford circuit that operates on a set of data qubits; and detecting, by the device, an error of the Clifford circuit by measuring a set of check qubits that respectively control, on the set of data qubits, nested one-sided Pauli checks that are leftward of the Clifford circuit.

Neither the human mind nor a human with pen and paper can electronically access a Clifford circuit and electronically detect errors in that Clifford circuit by executing randomized two-sided or one-sided Pauli checks. Moreover, neither the human mind nor a human with pen and paper can electronically interleave or intersperse SWAP gates throughout randomized two-sided or one-sided Pauli checks, so that such checks can be implemented on a linear nearest neighbor coupling topology rather than on an all-to-all coupling topology. After all, a quantum computer is a specialized piece of computing hardware that utilizes physical qubits (e.g., superconducting qubits, such a transmons) to process information. Physical qubits cannot be implemented by the human mind or by a human with pen and paper. Moreover, a quantum circuit can be a sequence of quantum gates that can be executed on a quantum computer. Neither the human mind, nor a human with pen and paper, can execute quantum gates (e.g., controlled Pauli operators, SWAP gates) on physical qubits. Therefore, a computerized tool that can detect errors in a Clifford circuit via implementation of randomized two-sided or one-sided Pauli checks interleaved with SWAP gates is inherently computerized and cannot be implemented in any sensible, practicable, or reasonable way without computers.

In various instances, one or more embodiments described herein can integrate the herein-described teachings into a practical application. As mentioned above, existing techniques for facilitating single-shot error mitigation utilize two-sided Pauli checks. As also mentioned above, the present inventors devised various technical improvements to two-sided Pauli checks.

In some aspects, the present inventors realized that the likelihood of error detection can be significantly improved by selecting left-side Pauli operators of two-sided Pauli checks randomly without replacement. As explained above, such random selection without replacement can cause each additional two-sided Pauli check to reduce the proportion of undetected errors within a Clifford circuit by about an incremental 50%. In other words, random selection without replacement can be considered as a clever or beneficial strategy for selecting which particular two-sided Pauli checks should be implemented so as to maximize error detection for any given Clifford circuit.

In other aspects, the present inventors recognized that existing techniques for facilitating two-sided Pauli checks often rely upon an all-to-all coupling topology, which can be considered as a difficult, burdensome, or expensive hardware architecture. In various instances, the present inventors realized that interleaving two-sided Pauli checks with SWAP gates (e.g., one respective SWAP gate following each controlled Pauli gate) can allow such two-sided Pauli checks to be implemented on a linear nearest neighbor coupling topology, which can be considered as a relaxed, non-burdensome, or inexpensive hardware architecture. More specifically, such interleaved SWAP gates can cause the quantum states of check qubits and the quantum states of data qubits to respectively and physically stair-step across the linear topology in opposite directions, such that the quantum state of each data qubit and the quantum state of each check qubit are, at some eventual point in time, hosted on physical qubits that are coupled together. Thus, implementation of such interleaved SWAP gates can be considered as significantly relaxing the hardware restrictions that existing techniques place upon two-sided Pauli checks. Furthermore, such interleaved SWAP gates can be considered as more efficient in terms of swapping and Controlled-Not cost than alternative placements or arrangements of SWAP gates.

In yet other aspects, the present inventors realized that two-sided Pauli checks can, in some instances, be simplified into one-sided Pauli checks. In particular, rather than randomly selecting left-side Pauli operators and subsequently identifying right-side Pauli operators via commutation rules, the right-side Pauli operators can instead be randomly selected without replacement from the set of all non-identity, Z-type Pauli operators, and the left side Pauli operators can be subsequently identified via commutation rules. In such case, the right-side Pauli operators can be simplified (e.g., via insertion of respective pairs of Hadamard gates) into either identity gates or Controlled-Not gates that target check qubits. In any case, those right-side Pauli operators can thus be considered as not altering the quantum states of any data qubits and as altering the quantum states of check qubits only according to classical Boolean operations (e.g., Exclusive-OR). Thus, those right-side Pauli operators can be omitted (hence the term "one-sided") and can instead by easily classically performed in post-processing. Accordingly, a quantum computational overhead of a randomized one-sided Pauli check can be considered as being nearly half that of a randomized two-sided Pauli check.

Such embodiments described herein can be considered as providing quantifiable performance improvements in the field of quantum error mitigation. For example, single-shot error detection via randomized two-sided Pauli checks can exhibit a higher level of accuracy or reliability (or can achieve a comparable level of accuracy by using fewer checks) as compared to existing techniques for facilitating two-sided Pauli checks. As another example, single-shot error detection via randomized one-sided Pauli checks can consume fewer computational resources (e.g., can require the execution of fewer quantum gates) as compared to existing techniques for facilitating two-sided Pauli checks. As yet another example, single-shot error detection via randomized two-sided or one-sided Pauli checks having interleaved SWAP gates can relax hardware architecture requirements or otherwise reduce Controlled-Not costs as compared to existing techniques for facilitating two-sided Pauli checks. These are concrete and tangible technical improvements in the field of quantum circuits. For at least these reasons, various embodiments described herein certainly constitute useful and practical applications of computers.

It should be appreciated that the figures and the herein disclosure describe non-limiting examples of various embodiments. It should further be appreciated that the figures are not necessarily drawn to scale.

FIG. 1 illustrates a block diagram of an example, non-limiting system 100 that can facilitate improved single-shot error mitigation for Clifford circuits in accordance with one or more embodiments described herein. As shown, a Pauli check system 102 can be electronically integrated, via any suitable wired or wireless electronic connections, with a quantum computer 104 and with a Clifford circuit 110.

In various embodiments, the quantum computer 104 can be any suitable quantum computing device or quantum computing hardware. In various aspects, the quantum computer 104 can comprise a set of data qubits 106. In various instances, the set of data qubits 106 can comprise n qubits for any suitable positive integer n: a data qubit 106(1) to a data qubit 106(n). In various cases, the quantum computer 104 can comprise a set of check qubits 108. In various aspects, the set of check qubits 108 can comprise m qubits for any suitable positive integer m: a check qubit 108(1) to a check qubit 108(m). In various instances, any of the set of data qubits 106 or any of the set of check qubits 108 can exhibit any suitable structure or architecture. As a non-limiting example, any of such qubits can exhibit a superconducting qubit architecture (e.g., such qubit can be constructed from any suitable number of Josephson junctions shunted by any suitable number of planar capacitor pads). As another non-limiting example, any of such qubits can exhibit a quantum dot architecture. As yet another non-limiting example, any of such qubits can exhibit a spin qubit architecture. In various aspects, different qubits of the set of data qubits 106 or of the set of check qubits 108 can exhibit the same or different structures or architectures as each other. Although not explicitly shown in FIG. 1, the quantum computer 104 can comprise or otherwise be associated with any suitable hardware or software (e.g., real-time controllers implemented in field programmable gate arrays of the quantum computer 104) that can be used to initialize any of the set of data qubits 106 or any of the set of check qubits 108, or that can be used to perform any suitable quantum operations (e.g., quantum gates, qubit measurements, qubit idling) on the set of data qubits 106 or on the set of check qubits 108.

In various aspects, the Clifford circuit 110 can be any suitable sequence of Clifford gates (e.g., Hadamard gates (H), Phase gates(S), or Controlled-Note gates (CNOT)) that can be executed in parallel or in series on the set of data qubits 106. Accordingly, in various instances, the Clifford circuit 110 can be considered as being an n-qubit Clifford circuit (e.g., as being a Clifford circuit that can operate on n qubits, as being an n-order tensor product). In some cases, the Clifford circuit 110 can be a Clifford layer within a larger, possibly non-Clifford quantum circuit.

In various instances, it can be desired to execute the Clifford circuit 110 on the set of data qubits 106 with single-shot error mitigation. As described herein, the Pauli check system 102 can facilitate such execution and single-shot error mitigation.

In various embodiments, the Pauli check system 102 can comprise a processor 112 (e.g., computer processing unit, microprocessor) and a non-transitory computer-readable memory 114 that is operably connected or coupled to the processor 112. The memory 114 can store computer-executable instructions which, upon execution by the processor 112, can cause the processor 112 or other components of the Pauli check system 102 (e.g., access component 116, detection component 118) to perform one or more acts. In various embodiments, the memory 114 can store computer-executable components (e.g., access component 116, detection component 118), and the processor 112 can execute the computer-executable components.

In various embodiments, the Pauli check system 102 can comprise an access component 116. In various aspects, the access component 116 can electronically access, in any suitable fashion, the quantum computer 104, such that the Pauli check system 102 can initialize, electronically activate (e.g., power-up), electronically deactivate (e.g., power-down), or otherwise electronically control the quantum computer 104. Furthermore, in various instances, the access component 116 can electronically receive, retrieve, obtain, import, or otherwise access, from any suitable data structures or from any suitable computing devices, the Clifford circuit 110. In any case, the access component 116 can electronically access (e.g., send or receive data or program instructions to or from) the quantum computer 104 or the Clifford circuit 110, such that other components of the Pauli check system 102 can electronically interact with the quantum computer 104 or with the Clifford circuit 110.

In various embodiments, the Pauli check system 102 can comprise a detection component 118. In various instances, the detection component 118 can electronically execute the Clifford circuit 110 on the set of data qubits 106. In some cases, as described herein, the detection component 118 can electronically detect an error associated with such execution by leveraging a set of nested, randomized two-sided Pauli checks that sandwich the Clifford circuit 110 and that are respectively controlled by the set of check qubits 108. In other cases, as described herein, the detection component 118 can electronically detect an error associated with such execution by leveraging a set of nested, randomized one-sided Pauli checks that are leftward of the Clifford circuit 110 and that are respectively controlled by the set of check qubits 108. In any of such cases, as described herein, the detection component 118 can relax hardware restrictions associated with such randomized two-sided or one-sided Pauli checks, by leveraging interleaved SWAP gates.

Figure 2:
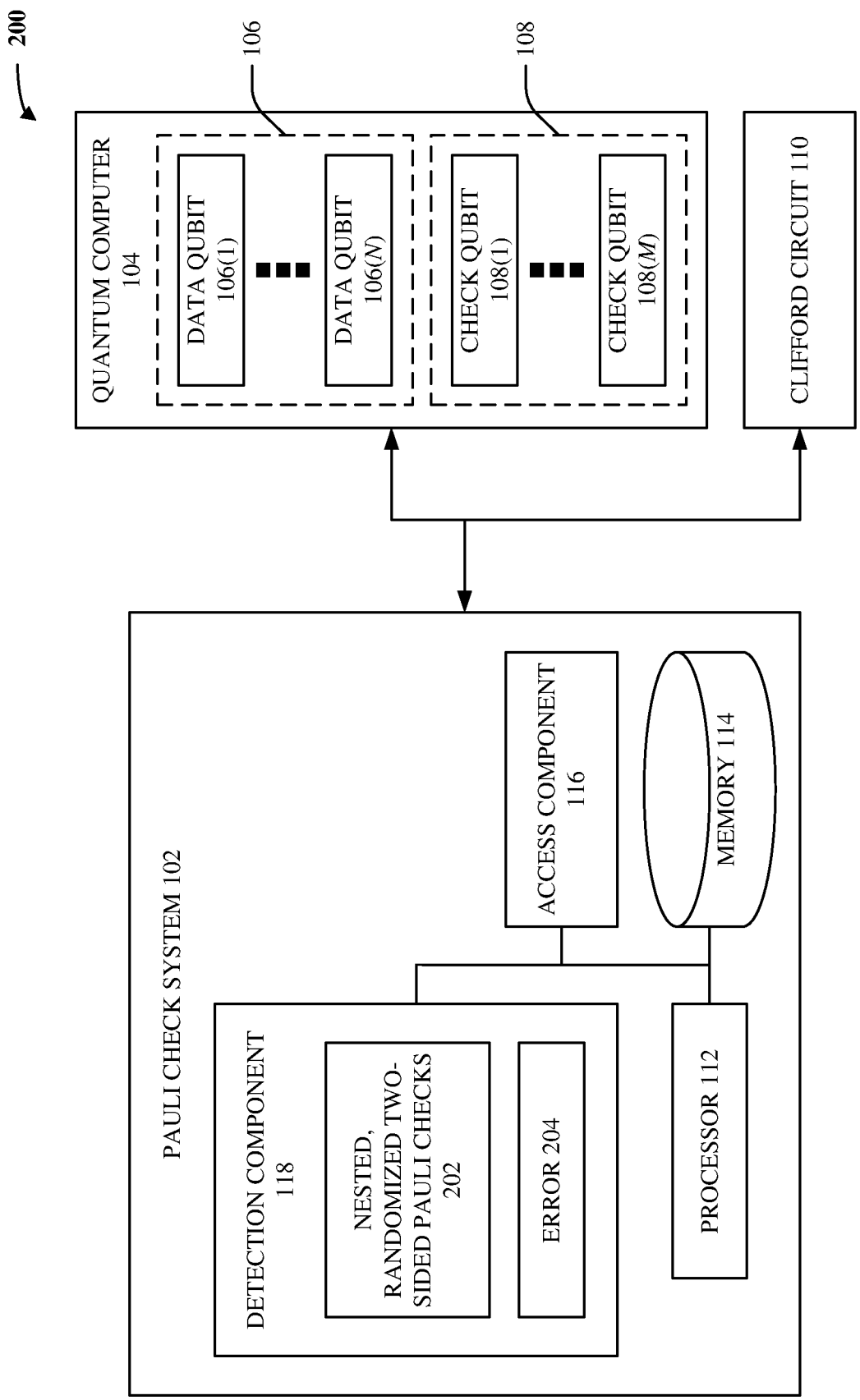
FIG. 2 illustrates a block diagram of an example, non-limiting system including a set of nested, randomized two-sided Pauli checks that facilitates improved single-shot error mitigation for Clifford circuits in accordance with one or more embodiments described herein.

FIG. 2 illustrates a block diagram of an example, non-limiting system 200 including a set of nested, randomized two-sided Pauli checks that can facilitate improved single-shot error mitigation for Clifford circuits in accordance with one or more embodiments described herein. As shown, the system 200 can, in some cases, comprise the same components as the system 100, and can further comprise a set of nested, randomized two-sided Pauli checks 202 and an error 204.

In various aspects, the set of nested, randomized two-sided Pauli checks 202 can respectively correspond (e.g., in one-to-one fashion) to the set of check qubits 108. Accordingly, since the set of check qubits 108 can comprise m qubits, the set of nested, randomized two-sided Pauli checks 202 can comprise m Pauli checks: a first randomized two-sided Pauli check to an m-th randomized two-sided Pauli check. In various instances, each randomized two-sided Pauli check can operate on the set of data qubits 106, can sandwich the Clifford circuit 110, and can be controlled by a respective one of the set of check qubits 108. In other words, each randomized two-sided Pauli check can comprise an n-qubit left-side Pauli operator that is positioned on a left (e.g., upstream) side of the Clifford circuit 110 and that is controlled by a respective one of the set of check qubits 108, and each randomized two-sided Pauli check can also comprise an n-qubit right-side Pauli operator that is positioned on a right (e.g., downstream) side of the Clifford circuit 110 and that is controlled by a respective one of the set of check qubits 108. In various cases, the left-side Pauli operators of the set of nested, randomized two-sided Pauli checks 202 can be selected randomly without replacement from the set of non-identity, n-qubit Pauli operators, and the right-side Pauli operators of the set of nested, randomized two-sided Pauli checks 202 can be respectively identified via commutation relations that relate the Clifford circuit 110 to those randomly-selected left-side Pauli operators.

In various aspects, the detection component 118 can electronically execute the set of nested, randomized two-sided Pauli checks 202 and the Clifford circuit 110 on the quantum computer 104, and resulting measured states of the set of check qubits 108 can indicate, convey, or otherwise represent whether or not an n-qubit Pauli error associated with the Clifford circuit 110 was detected. In various cases, such error can be referred to as the error 204. In various aspects, the detection component 118 can repeatedly execute the Clifford circuit 110 and the set of nested, randomized two-sided Pauli checks 202, until the error 204 is not detected. Various non-limiting aspects are described with respect to FIGS. 3-6.

Figure 3:
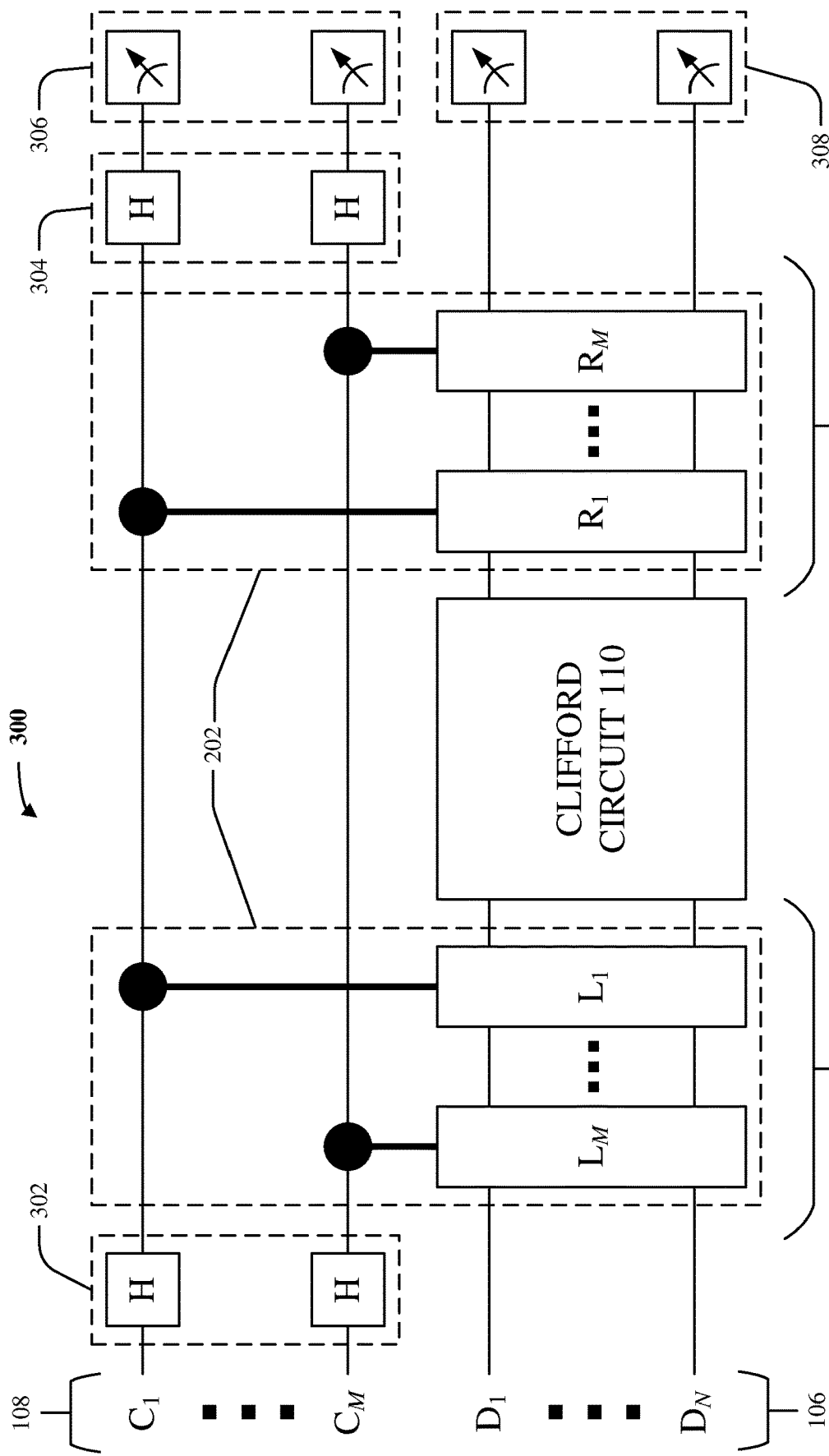
FIG. 3 illustrates an example, non-limiting quantum circuit diagram showing how a set of nested, randomized two-sided Pauli checks can be implemented to mitigate errors associated with a Clifford circuit in accordance with one or more embodiments described herein.

FIG. 3 illustrates an example, non-limiting quantum circuit diagram 300 showing how the set of nested, randomized two-sided Pauli checks 202 can be implemented to mitigate errors associated with the Clifford circuit 110 in accordance with one or more embodiments described herein.

For case of illustration, the set of data qubits 106 and the set of check qubits 108 can be represented in quantum circuit diagrams via short-hand notation. As some non-limiting examples, the data qubit 106(1) can be represented as "$D_1$", the data qubit 106(n) can be represented as "$D_n$", the check qubit 108(1) can be represented as "$C_1$", and the check qubit 108(m) can be represented as "$C_m$".

Although not explicitly shown in FIG. 3, the detection component 118 can electronically initialize the set of data qubits 106 and the set of check qubits 108 in any suitable fashion. As a non-limiting example, the detection component 118 can initialize each of the set of data qubits 106 and each of the set of check qubits 108 to $|0\rangle$.

In various instances, $\mathcal{P}_n$ can represent the total set of all possible n-qubit Pauli operators. That is, $\mathcal{P}_n = \omega\{I, X, Y, Z\}^{\otimes n}$, where I can be the single-qubit identity gate, where X can be the single-qubit Pauli-X gate, where Y can be the single-qubit Pauli-Y gate, where Z can be the single-qubit Pauli-Z gate, and where $\omega \in \{\pm 1\}$ can be a phase factor. In various cases, $\mathcal{C}_n$ can represent the n-qubit Clifford group. That is, $\mathcal{C}_n$ can contain all n-qubit unitary operators A such that $AP_n A^\dagger \in \mathcal{P}_n$ for any $P_n \in \mathcal{P}_n$.

As shown, the Clifford circuit 110 can operate on the set of data qubits 106. As also shown, the set of nested, randomized two-sided Pauli checks 202 can operate on the set of data qubits 106 and can be respectively controlled by the set of check qubits 108. As mentioned above, the set of nested, randomized two-sided Pauli checks 202 can respectively correspond (e.g., in one-to-one fashion) with the set of check qubits 108, such that there can be one respective or unique randomized two-sided Pauli check per check qubit.

As a non-limiting example, a first randomized two-sided Pauli check of the set of nested, randomized two-sided Pauli checks 202 can correspond to the check qubit 108(1). In various aspects, that first randomized two-sided Pauli check can comprise a first left-side Pauli operator (denoted by $L_1$) that is on a left (e.g., upstream) side of the Clifford circuit 110 and a first right-side Pauli operator (denoted by $R_1$) that is on a right (e.g., downstream) side of the Clifford circuit 110. In other words, $L_1$ and $R_1$ can collectively sandwich the Clifford circuit 110. In various aspects, $L_1$ can be randomly selected without replacement from the set of all possible n-qubit Pauli operators, less the n-qubit identity operator. That is, $L_1$ can be randomly selected from $\mathcal{P}_n \setminus \{I^{\otimes n}\}$. When given $L_1$, commutation rules can be used to identify $R_1$. For instance, $R_1 = U_1 L_1 U_1^\dagger$, where $U_1 \in \mathcal{C}_n$ can represent whatever quantum gates are sandwiched by $L_1$ and $R_1$. As shown, there can be only the Clifford circuit 110 in between $L_1$ and $R_1$, and so $U_1$ can be considered as representing the Clifford circuit 110. In any case, as shown, $L_1$ and $R_1$ can both be controlled by the check qubit 108(1).

As another non-limiting example, a second randomized two-sided Pauli check (not shown) of the set of nested, randomized two-sided Pauli checks 202 can correspond to a check qubit 108(2) (not shown). In various aspects, that second randomized two-sided Pauli check can comprise a second left-side Pauli operator (denoted by $L_2$, not shown) that is on a left (e.g., upstream) side of $L_1$ and a second right-side Pauli operator (denoted by $R_2$, not shown) that is on a right (e.g., downstream) side of $R_1$. In other words, $L_2$ and $R_2$ can collectively sandwich $L_1$, the Clifford circuit 110, and $R_1$. Just as above, $L_2$ can be randomly selected without replacement (e.g., such that $L_2 \neq L_1$) from the set of all possible n-qubit Pauli operators, less the n-qubit identity operator, and $R_2$ can be identified by commutation relations. In particular, $L_2$ can be randomly selected from $\mathcal{P}_n \setminus \{I^{\otimes n}, L_1\}$, and $R_2 = U_2 L_2 U_2^\dagger$, where $U_2 \in \mathcal{C}_n$ can represent whatever quantum gates are sandwiched by $L_2$ and $R_2$. Accordingly, $U_2$ can be considered as representing $L_1$, the Clifford circuit 110, and $R_1$. In any case, $L_2$ and $R_2$ can both be controlled by the check qubit 108(2).

Continuing in this fashion, and as yet another non-limiting example, an m-th randomized two-sided Pauli check of the set of nested, randomized two-sided Pauli checks 202 can correspond to the check qubit 108(m). In various aspects, that m-th randomized two-sided Pauli check can comprise an m-th left-side Pauli operator (denoted by $L_m$) that is on a left (e.g., upstream) side of an (m−1)-th left-side Pauli operator (denoted by $L_{m-1}$, not shown) and an m-th right-side Pauli operator (denoted by $R_m$) that is on a right (e.g., downstream) side of an (m−1)-th right-side Pauli operator (denoted by $R_{m-1}$, not shown). That is, $L_m$ and $R_m$ can collectively sandwich the previous m−1 left-side Pauli operators, the Clifford circuit 110, and the previous m−1 right-side Pauli operators. Just as above, $L_m$ can be randomly selected without replacement (e.g., such that $L_m \neq L_i$ for all positive integers $i \in [1, m-1]$) from the set of all possible n-qubit Pauli operators, less the n-qubit identity operator, and $R_m$ can be identified by commutation relations. In particular, $L_m$ can be randomly selected from $\mathcal{P}_n \setminus \{I^{\otimes n}, L_1, \ldots, L_{m-1}\}$, and $R_m = U_m L_m U_m^\dagger$, where $U_m \in \mathcal{C}_n$ can represent whatever quantum gates are sandwiched by $L_m$ and $R_m$. Accordingly, $U_m$ can be considered as representing the previous m−1 left-side Pauli operators, the Clifford circuit 110, and the previous m−1 right-side Pauli operators. In any case, as shown, $L_m$ and $R_m$ can both be controlled by the check qubit 108(m).

In various aspects, as shown by numeral 302, a Hadamard gate can be applied to each of the set of check qubits 108 prior to (e.g., upstream of) the respective left-side Pauli operator (e.g., $L_1$, $L_m$) controlled by that check qubit. Similarly, as shown by numeral 304, a Hadamard gate can be applied to each of the set of check qubits 108 following (e.g., downstream of) the respective right-side Pauli operator (e.g., $R_1$, $R_m$) controlled by that check qubit. In various instances, such Hadamard gates can be considered as placing each of the set of check qubits 108 into an X-basis for measurement.

In various cases, as shown, the detection component 118 can execute the Clifford circuit 110 and the set of nested, randomized two-sided Pauli checks 202 on the quantum computer 104. After such execution, the detection component 118 can measure the resulting quantum states of the set of check qubits 108, thereby yielding a set of measured states 306. Likewise, after such execution, the detection component 118 can measure the resulting quantum states of the set of data qubits 106, thereby yielding a set of measured states 308.

In various aspects, the set of measured states 308 can be of interest (e.g., can represent the computational results of executing the Clifford circuit 110). However, the set of measured states 308 might or might not be tainted by the error 204 (e.g., might be made unreliable or inaccurate by the error 204). In various instances, due to the set of nested, randomized two-sided Pauli checks 202, the set of measured states 306 can be considered as indicating, conveying, or otherwise representing whether or not the error 204 was detected. In particular, if each of the set of measured states 306 is |0⟩, then the detection component 118 can determine or conclude either: that the error 204 did not occur; or that the error 204 occurred but was of an undetectable type or form. In such case, the error 204 can be considered or otherwise deemed as absent (notwithstanding the possibility of the error 204 occurring in undetected fashion), the set of measured states 308 can be deemed acceptable, and the detection component 118 can take any suitable action with respect to the set of measured states 308 (e.g., can render the set of measured states 308 on any suitable electronic display, can transmit the set of measured states 308 to any other suitable computing device). On the other hand, if at least one of the set of measured states 306 is |1⟩, then the detection component 118 can determine or conclude that the error 204 occurred. In such case, the error 204 can be considered or deemed as present, and the detection component 118 can discard both the set of measured states 306 and the set of measured states 308. In various aspects, the detection component 118 can post-select the set of measured states 308 on condition that each of the set of measured states 306 is |0⟩. In other words, the detection component 118 can repeatedly execute the Clifford circuit 110 and the set of nested, randomized two-sided Pauli checks 202, until each of the set of measured states 306 is |0⟩.

Because the set of nested, randomized two-sided Pauli checks 202 can be randomly selected without replacement, the likelihood of the error 204 being present but undetected can be significantly reduced. Indeed, according to the depolarizing noise model of quantum computing, the error 204 can be assumed to be a Pauli error. A two-sided Pauli check selected randomly without replacement can anti-commute with (and thus detect) any given Pauli error with a probability of 50%. Accordingly, by applying a total of m randomized two-sided Pauli checks, errors can be detected (and thus suppressed) in the Clifford circuit 110 roughly by a factor of $2^{-m}$, assuming that two-sided Pauli checks are themselves error-free. In practice, two-sided Pauli checks themselves can experience errors. So, errors generated by the outermost two-sided Pauli check (e.g., by $L_m$ and $R_m$) can be undetectable. However, errors generated by any inner two-sided Pauli check (e.g., by $L_1$ to $L_{m-1}$ or $R_1$ to $R_{m-1}$) can be detected by some other of the set of nested, randomized two-sided Pauli checks 202. Accordingly, although the set of nested, randomized two-sided Pauli checks 202 cannot detect 100% of all possible errors associated with the Clifford circuit 110, the set of nested, randomized two-sided Pauli checks 202 can nevertheless significantly decrease the prevalence of errors in the Clifford circuit 110, as compared to situations in which no Pauli checks or non-randomized Pauli checks are implemented.

To help demonstrate various advantages of the set of nested, randomized two-sided Pauli checks 202, the present inventors conducted various experiments. Results from those various experiments are illustrated graphically in FIGS. 4-5. With respect to such experiments, the term "post-selection probability" can refer to the probability that all of the set of measured states 306 are |0⟩, and the term "logical error probability" can refer to the probability that some undetected error occurred notwithstanding each of the set of measured states 306 being |0⟩. In such experiments, the present inventors derived formulas for calculating such quantities as a function of m (e.g., number of Pauli checks), n (e.g., number of data qubits), and K, where K can represent the number of Controlled-Not gates in the Clifford circuit 110. In such experiments, single-qubit gates were assumed to be noiseless, and Controlled-Not gates were assumed to be noisy with a probability ε of failing. Here, ε can be called the "error rate". Furthermore, in such experiments, the present inventors assumed that a failed Controlled-Not gate can be modeled as a noiseless Controlled-Not gate followed by a two-qubit Pauli error picked uniformly at random.

In such experiments, the present inventors modeled the set of nested, randomized two-sided Pauli checks 202 as a Markov chain with m time steps. Each time step can be considered as describing the application of a noisy check. The Markov chain can be considered as having three possible states: a state 1 indicating a detected error (e.g., at least one of the set of measured states 306 can be |1⟩); a state 2 indicating no error (e.g., all of the set of measured states 306 can be |0⟩, and the error 204 can be considered as being absent or as being an n-qubit identity operator); and a state 3 indicating an undetected error (e.g., all of the set of measured states 306 can be |0⟩, but the error 204 can be considered as being present or as being an n-qubit non-identity Pauli operator).

Each time step of the Markov chain can be described by a normalized probability vector $$\pi = \begin{bmatrix} \pi_1 \\ \pi_2 \\ \pi_3 \end{bmatrix}$$

where $\pi_i$ can be the probability of the Markov chain being in the i-th state of the above-mentioned three possible states, for any suitable positive integer i∈ [1, 3]. In various aspects, the initial probability vector (e.g., m=0) can be given by:

$$\pi = \begin{bmatrix} 0 \\ (1-\varepsilon)^K \\ 1-(1-\varepsilon)^K \end{bmatrix}$$

For each following time step, the probability vector can be incrementally updated by:

$$\begin{bmatrix} \pi_1 \\ \pi_2 \\ \pi_3 \end{bmatrix} \leftarrow T \begin{bmatrix} \pi_1 \\ \pi_2 \\ \pi_3 \end{bmatrix}$$

where T can be a 3-by-3 update matrix. For an ideal (e.g., noiseless) randomized two-sided Pauli check, T can be given by:

$$T = \begin{bmatrix} 1 & 0 & 1/2 \\ 0 & 1 & 0 \\ 0 & 0 & 1/2 \end{bmatrix}$$

As shown, such construction of T can cause the following in the Markov chain model: if an error is present, it is detected with 50% probability; once an error is detected, it remains detected. However, this is a mere non-limiting example. In other cases, T can vary. For instance, T for a noisy randomized two-sided Pauli check can be given by:

$$T = \begin{bmatrix} 1 & t_{de} & t_{ok}/2 + t_{de} \\ 0 & t_{ok} & 0 \\ 0 & t_{ue} & t_{ok}/2 + t_u \end{bmatrix}$$

where $t_{de}$ can be the probability of a randomized two-sided Pauli check indicating a detected error, where $t_{ok}$ can be the probability of a randomized two-sided Pauli check indicating no error when there actually is no non-identity error, and where $t_{ue}$ can be the probability of a randomized two-sided Pauli check indicating no error when there actually is a non-identity error (e.g., $t_{ue}$ can be probability of an undetected error for a single check). Those quantities can be given as follows:

$$t_{de} = \frac{1}{2} - \frac{1}{2}\left(1 - \frac{16}{15}\varepsilon\right)^{|L_i|+|R_i|}$$

$$t_{ok} = (1-\varepsilon)^{|L_i|+|R_i|}$$

$$t_{ue} = 1 - t_{de} - t_{ok}$$

where $L_i$ and $R_i$ can be the left-side and right-side Pauli operators, respectively, for the i-th time step, and thus for the i-th randomized two-sided Pauli check, for any suitable positive integer $i \in [1, m]$, and where $|L_i|$ and $|R_i|$ can be the Hamming weights for $L_1$ and $R_i$, respectively. Note that $|L_i| \approx |R_i| \approx 3n/4$ with high probability for $L_i$ selected randomly without replacement.

Accordingly, the following can be obtained:

$$\pi = \begin{bmatrix} \pi_1 \\ \pi_2 \\ \pi_3 \end{bmatrix} = T_m T_{m-1} \ldots T_2 T_1 \begin{bmatrix} 0 \\ (1-\varepsilon)^K \\ 1-(1-\varepsilon)^K \end{bmatrix}$$

where $T_i$ can be the update matrix T at the i-th time step for any suitable positive integer $i \in [1, m]$. With this calculation for the state probabilities $\pi$, the post-selection probability for the set of nested, randomized two-sided Pauli checks 202 can be computed as $\pi_2 + \pi_3$, and the logical error probability for the set of nested, randomized two-sided Pauli checks 202 can be computed as $\pi_3/(\pi_2 + \pi_3)$.

Let $P_L(\varepsilon, m)$ denote the logical error probability after adding m randomized two-sided Pauli checks. The present inventors realized that there can be some real-valued error threshold $\varepsilon_{th} > 0$ such that $P_L(\varepsilon, m+1) < P_L(\varepsilon, m)$ for all m if $\varepsilon < \varepsilon_{th}$, and such that $P_L(\varepsilon, m+1) > P_L(\varepsilon, m)$ for all m if $\varepsilon > \varepsilon_{th}$. It can be shown that:

$$P_L(\varepsilon, m+1) = \frac{\frac{t_{ue}}{t_{ok}} + \frac{P_L(\varepsilon, m)}{2}}{1 + \frac{t_{ue}}{t_{ok}} - \frac{P_L(\varepsilon, m)}{2}}$$

and $$P_L(\varepsilon, 0) = (1-\varepsilon)^K$$

Note that the error threshold can be identified by solving the fixed-point equation $P_L(\varepsilon, m+1) = P_L(\varepsilon, m)$, which can be equivalent to $2t_{ue} = t_{ok}$ or $$1 + \left(1 - \frac{16}{15}\varepsilon\right)^{3n/2} = 3(1-\varepsilon)^{3n/2}$$

Figure 4:
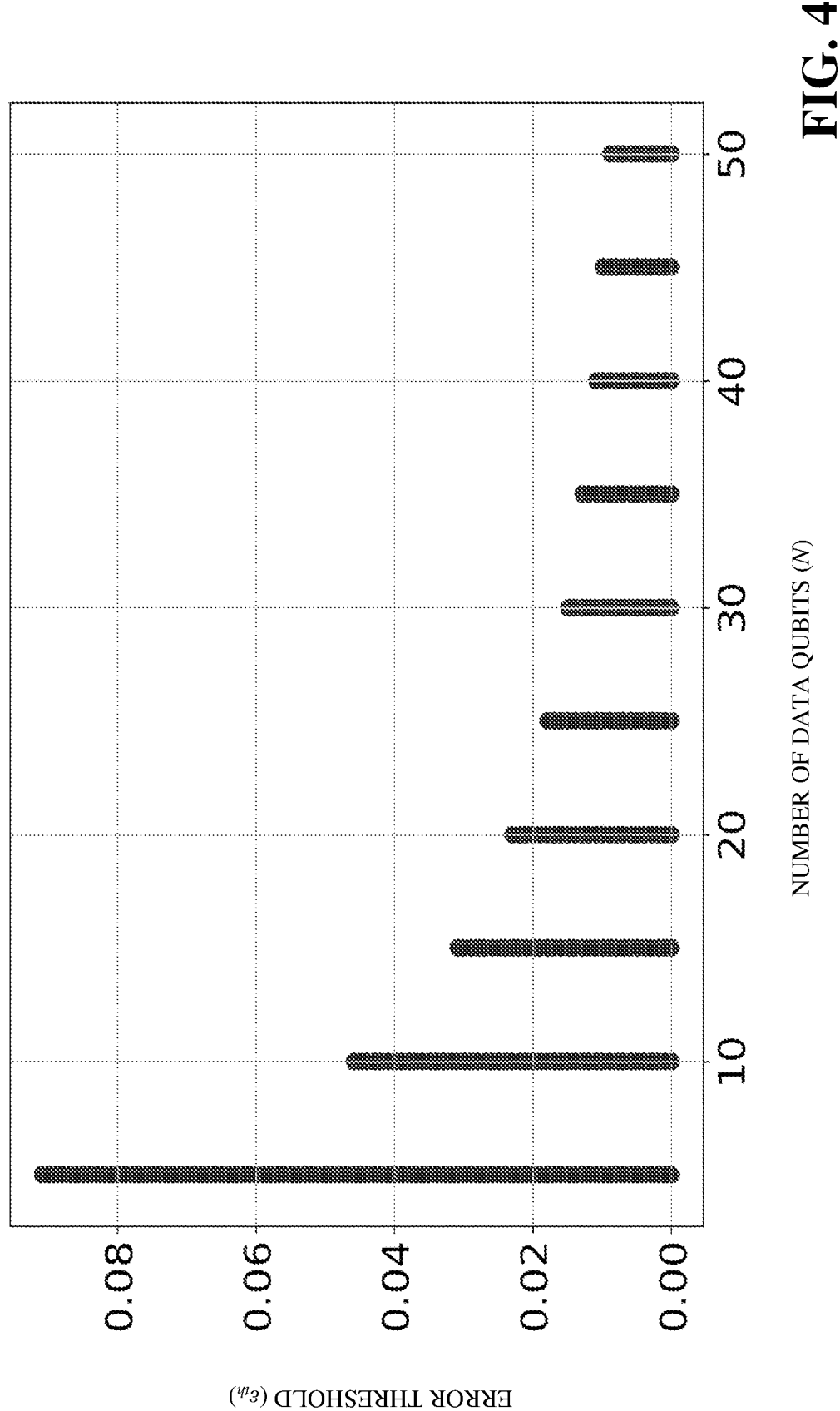
FIGS. 4-5 illustrate example, non-limiting experimental results in accordance with one or more embodiments described herein.

The value of $\varepsilon$ that satisfies this equation can be considered as $\varepsilon_{th}$. Note that $\varepsilon_{th}$ thus depends only upon n (e.g., the number of data qubits); $\varepsilon_{th}$ does not depend upon the depth of the Clifford circuit 110. FIG. 4 depicts a graph 400 that illustrates how $\varepsilon_{th}$ can vary with n.

Consider a situation in which $\varepsilon n \ll 1$ as m gets progressively larger. In such case, the logical error probability can saturate at a constant, asymptotic value. In particular, such constant, asymptotic value can be denoted as $P_{L\_Floor}$, and it can be given by:

$$P_{L\_Floor} = \lim_{m \to \infty} P_L(\varepsilon, m) = \frac{2t_{ue}}{t_{ok}} \approx \frac{7\varepsilon n}{5}$$

Figure 5:
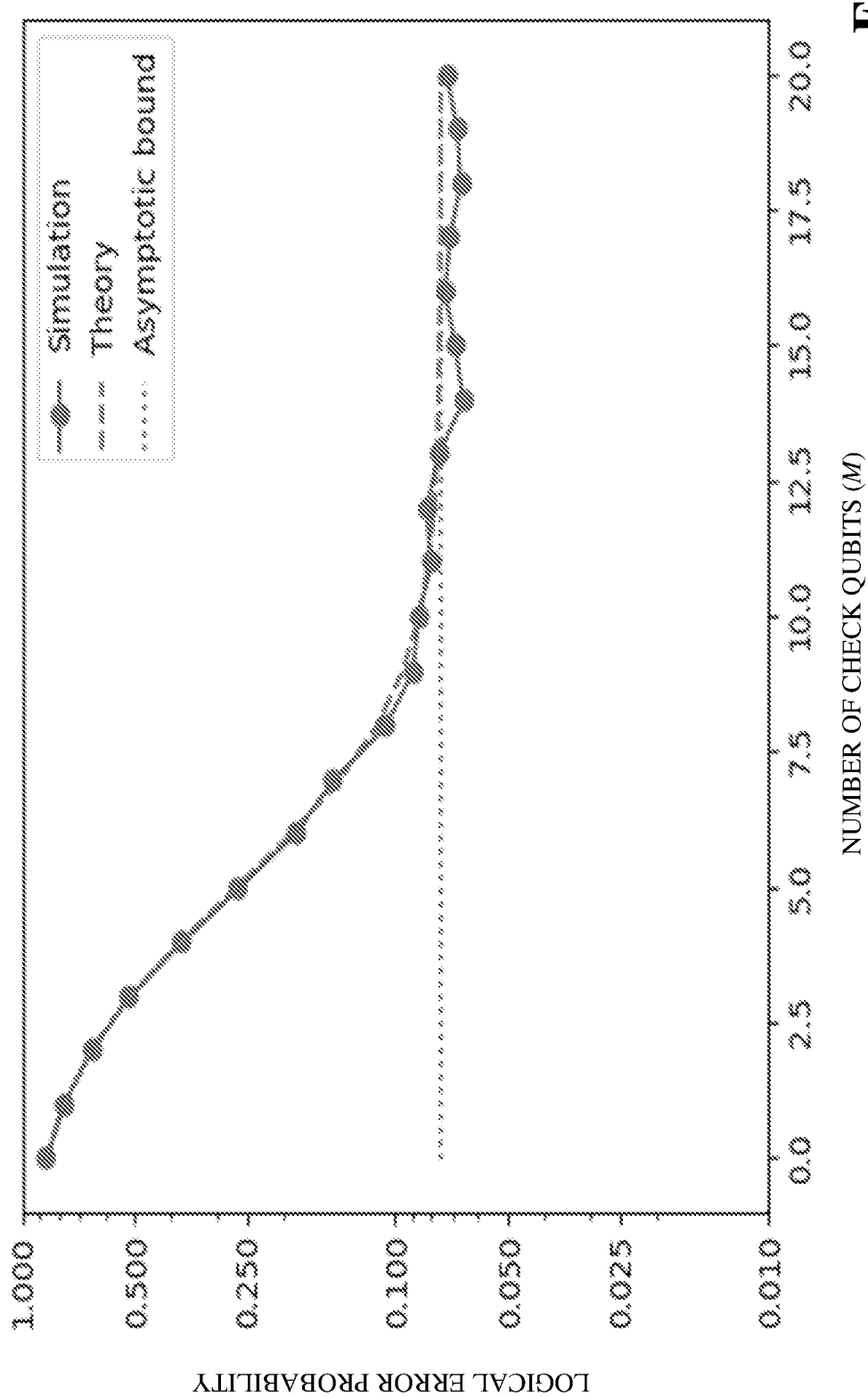

Accordingly, $P_{L\_Floor}$ can scale linearly with n (e.g., the number of data qubits) and does not depend upon the depth of the Clifford circuit 110. FIG. 5 depicts a graph 500 that illustrates this asymptotic behavior of $P_{L\_Floor}$ as a function of m (e.g., the number of check qubits). The graph 500 was obtained for n=50, K=2000, and $\varepsilon$=0.001. These are mere non-limiting example values. As shown, $P_{L\_Floor}$ can be about 7.5% for such case. Note how quickly random selection without replacement allows the logical error probability to approach the asymptotic floor (e.g., the floor is reached at about m=10). If two-sided Pauli checks were selected according to some different strategy (e.g., not random selection without replacement), the achieved logical error probability could approach the asymptotic bound more slowly or could have a higher asymptotic bound altogether. Alternatively, it might be possible that careful, non-random selection of two-sided Pauli checks based on the specific form of the Clifford circuit 110 or of the error 204 could yield a lower logical error probability floor. However, such careful, non-random selection would be highly context dependent and not generalizable across different Clifford circuits. Because random selection without replacement can (as shown at least by FIG. 5) deliver high error detection and can be applied to any Clifford circuit, random selection without replacement can be considered as a universally advantageous strategy for selecting the set of nested, randomized two-sided Pauli checks 202.

Figure 6:
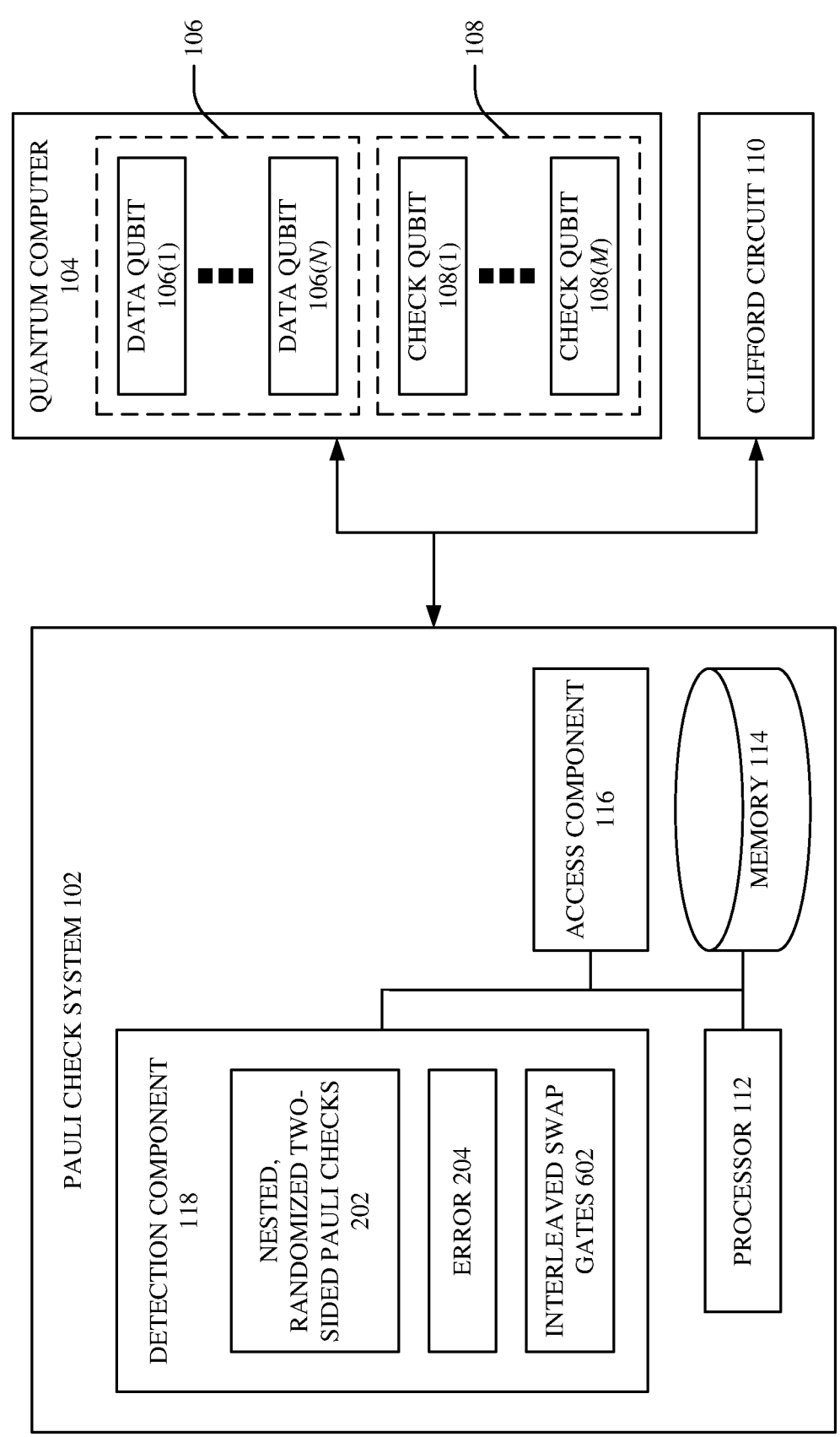
FIG. 6 illustrates a block diagram of an example, non-limiting system including a set of interleaved SWAP gates that facilitates improved single-shot error mitigation for Clifford circuits in accordance with one or more embodiments described herein.

FIG. 6 illustrates a block diagram of an example, non-limiting system 600 including a set of interleaved SWAP gates that can facilitate improved single-shot error mitigation for Clifford circuits in accordance with one or more embodiments described herein. As shown, the system 600 can, in some cases, comprise the same components as the system 200, and can further comprise a set of interleaved SWAP gates 602.

In various embodiments, the set of nested, randomized two-sided Pauli checks 202 can be implemented when the quantum computer 104 exhibits an all-to-all coupling topology between the set of data qubits 106 and the set of check qubits 108. After all, each left-sided Pauli operator (e.g., $L_1$ to $L_m$) and each right-sided Pauli operator (e.g., $R_1$ to $R_m$) of the set of nested, randomized two-sided Pauli checks 202 can operate on the set of data qubits 106 and can be controlled by a respective one of the set of check qubits 108. Because an all-to-all coupling topology can cause each of the set of data qubits 106 to be coupled to each of the set of check qubits 108, an all-to-all coupling topology can suffice for implementation of the set of nested, randomized two-sided Pauli checks 202. However, this is a mere non-limiting example.

In various other embodiments, the detection component 118 can insert the set of interleaved SWAP gates 602 into the set of nested, randomized two-sided Pauli checks 202, and such insertion can allow the set of nested, randomized two-sided Pauli checks 202 to be implemented when the quantum computer 104 instead exhibits a linear nearest neighbor coupling topology. Because a linear nearest neighbor coupling topology can be considered as a relaxed, less-difficult-to-implement hardware architecture for the quantum computer 104, the set of interleaved SWAP gates 602 can be considered as increasing the generalizability of the set of nested, randomized two-sided Pauli checks 202, which can be advantageous or desirable.

More specifically, the set of check qubits 108 and the set of data qubits 106 can be linearly coupled together. In various aspects, such linear coupling can be considered as forming a branchless chain of qubits. In various instances, the set of check qubits 108 can be clustered, in indexed order (e.g., from 1 to m), at one end of that branchless chain, and the set of data qubits 106 can be clustered, in indexed order (e.g., from 1 to n), at the other end of that branchless chain. Thus, there can be one data qubit and one check qubit that are initially coupled together. Each of the remaining data qubits can be initially coupled only to other data qubits, and each of the remaining check qubits can likewise be initially coupled only to other check qubits.

In various aspects, the left-side Pauli operators (e.g., $L_1$ to $L_m$) and the right-side Pauli operators (e.g., $R_1$ to $R_m$) can each be considered as being made up of controlled Pauli gates (various of which can be executed concurrently with each other). In various instances, the set of interleaved SWAP gates 602 can respectively correspond (e.g., in one-to-one fashion) to those controlled Pauli gates. In particular, a unique or respective one of the set of interleaved SWAP gates 602 can follow (e.g., be downstream of) each of such controlled Pauli gates. Accordingly, the set of interleaved SWAP gates 602 can be considered as being interspersed, interdigitated, or otherwise interleaved throughout the set of nested, randomized two-sided Pauli checks 202.

Now, as mentioned above, linear coupling in indexed order can cause there to be one data qubit and one check qubit that are initially coupled together. Without loss of generality, suppose that the set of check qubits 108 are linearly coupled in indexed order (e.g., 108(1) coupled to 108(2) coupled to . . . coupled to 108(m)) and are located at a first end of the linear topology, suppose that the set of data qubits 106 are similarly linearly coupled in indexed order (e.g., 106(1) coupled to 106(2) coupled to . . . coupled to 106(n)) and are located at a second end of the linear topology, and suppose that the data qubit 106(1) is initially coupled to the check qubit 108(m).

Given such coupling, the detection component 118 can execute, with the set of interleaved SWAP gates 602, the left-side Pauli operators of the set of nested, randomized two-sided Pauli checks 202 as follows.

First, the detection component 118 can execute whichever left-side controlled Pauli gate is both targeted at the data qubit 106(1) and controlled by the check qubit 108(m). The detection component 118 can then execute a SWAP gate (e.g., one of 602) on the data qubit 106(1) and the check qubit 108(m). Such SWAP gate can cause the quantum state of the data qubit 106(1) to switch with that of the check qubit 108(m). In other words, the physical qubit that previously hosted the quantum state of the data qubit 106(1) can now host the quantum state of the check qubit 108(m). In still other words, the physical qubit that previously was referred to as the data qubit 106(1) can now be referred to as the check qubit 108(m), and the physical qubit that previously was referred to as the check qubit 108(m) can now be referred to as the data qubit 106(1). In even other words, such SWAP gate can be considered as having caused the data qubit 106(1) to take one positional or physical step away from the second end of the linear topology and toward the first end of the linear topology, and such SWAP gate can conversely be considered as having caused the check qubit 108(m) to take one positional or physical step away from the first end of the linear topology and toward the second end of the linear topology. Accordingly, such SWAP gate can be considered as updating the linear coupling order of the set of data qubits 106 and of the set of check qubits 108, so that the data qubit 106(1) can now be coupled to the check qubit 108(m−1), and so the check qubit 108(m) can now be coupled to the data qubit 106(2).

Next, the detection component 118 can execute whichever left-side controlled Pauli gate is both targeted at the data qubit 106(1) and controlled by the check qubit 108(m−1) (since those two qubits can now be coupled together), and the detection component 118 can likewise execute whichever left-side controlled Pauli gate is both targeted at the data qubit 106(2) and controlled by the check qubit 108(m) (since those two qubits can now be coupled together). The detection component 118 can then execute a SWAP gate (e.g., another of 602) on the data qubit 106(1) and the check qubit 108(m−1), and the detection component 118 can also execute a SWAP gate (e.g., yet another of 602) on the data qubit 106(2) and the check qubit 108(m), thereby updating the linear coupling order of the set of data qubits 106 and of the set of check qubits 108 once again.

This pattern can be repeated until all of the controlled Pauli gates of the left-side Pauli operators of the set of nested, randomized two-sided Pauli checks 202 have been executed by the detection component 118. At such point, each of the set of data qubits 106 can be considered as having taken m positional or physical steps (e.g., one step per check qubit) in the linear topology away from the second end and toward the first end, whereas each of the set of check qubits 108 can instead be considered as having taken n positional or physical steps (e.g., one step per data qubit) in the linear topology away from the first end and toward the second end. Accordingly, at such point, the set of check qubits 108 can be linearly coupled in indexed order (e.g., 108(1) coupled to 108(2) coupled to . . . coupled to 108(m)) and located at the second end of the linear topology, the set of data qubits 106 can be similarly linearly coupled in indexed order (e.g., 106(1) coupled to 106(2) coupled to . . . coupled to 106(n)) and located at the first end of the linear topology, and the data qubit 106(n) can be coupled to the check qubit 108(1).

After execution of the Clifford circuit 110, the detection component 118 can execute, with the set of interleaved SWAP gates 602, the right-side Pauli operators of the set of nested, randomized two-sided Pauli checks 202 in analogous fashion.

Figure 7:
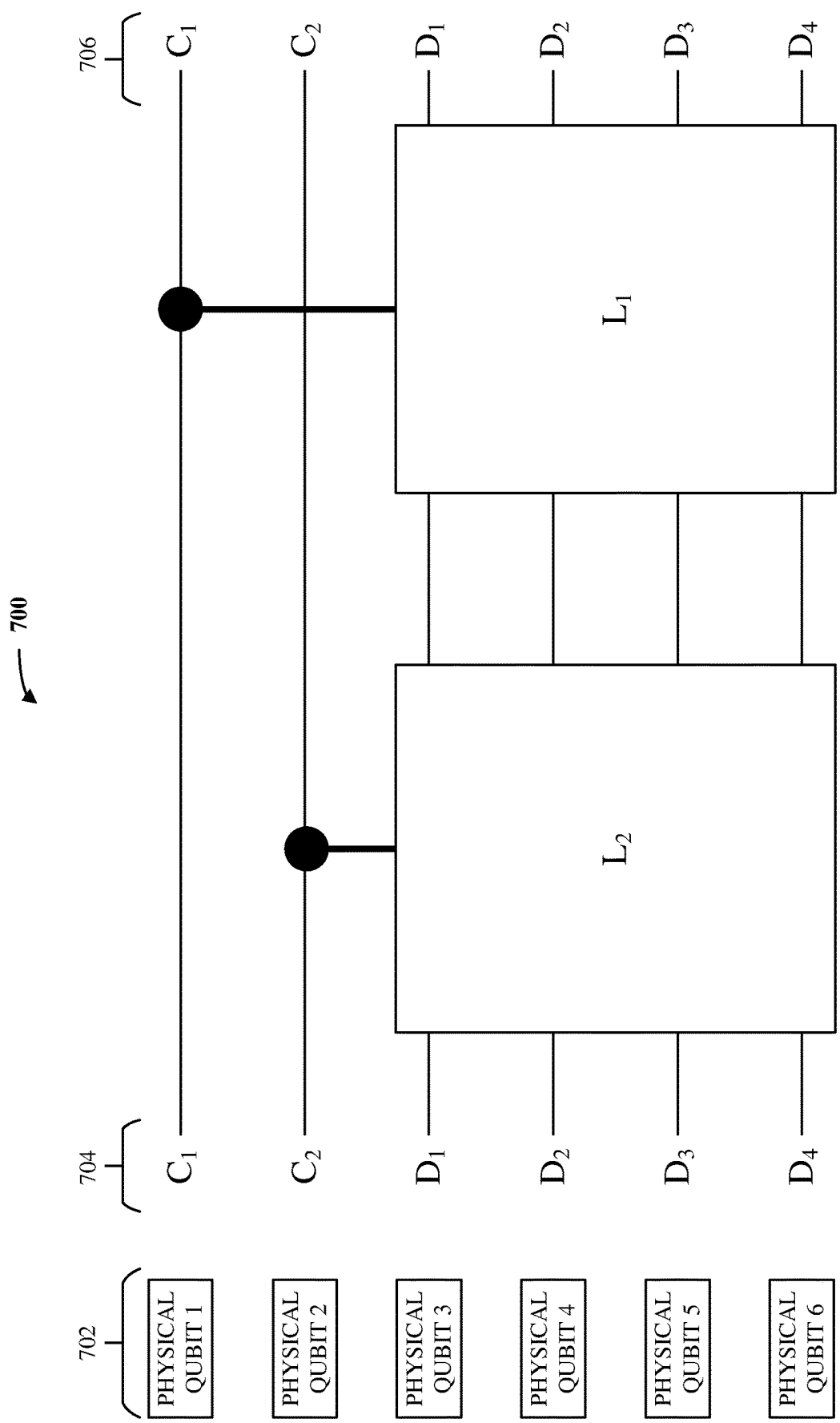
FIGS. 7-9 illustrate example, non-limiting quantum circuit diagrams showing how left-side Pauli operators of randomized two-sided Pauli checks can be implemented with interleaved SWAP gates in accordance with one or more embodiments described herein.
Figure 8:
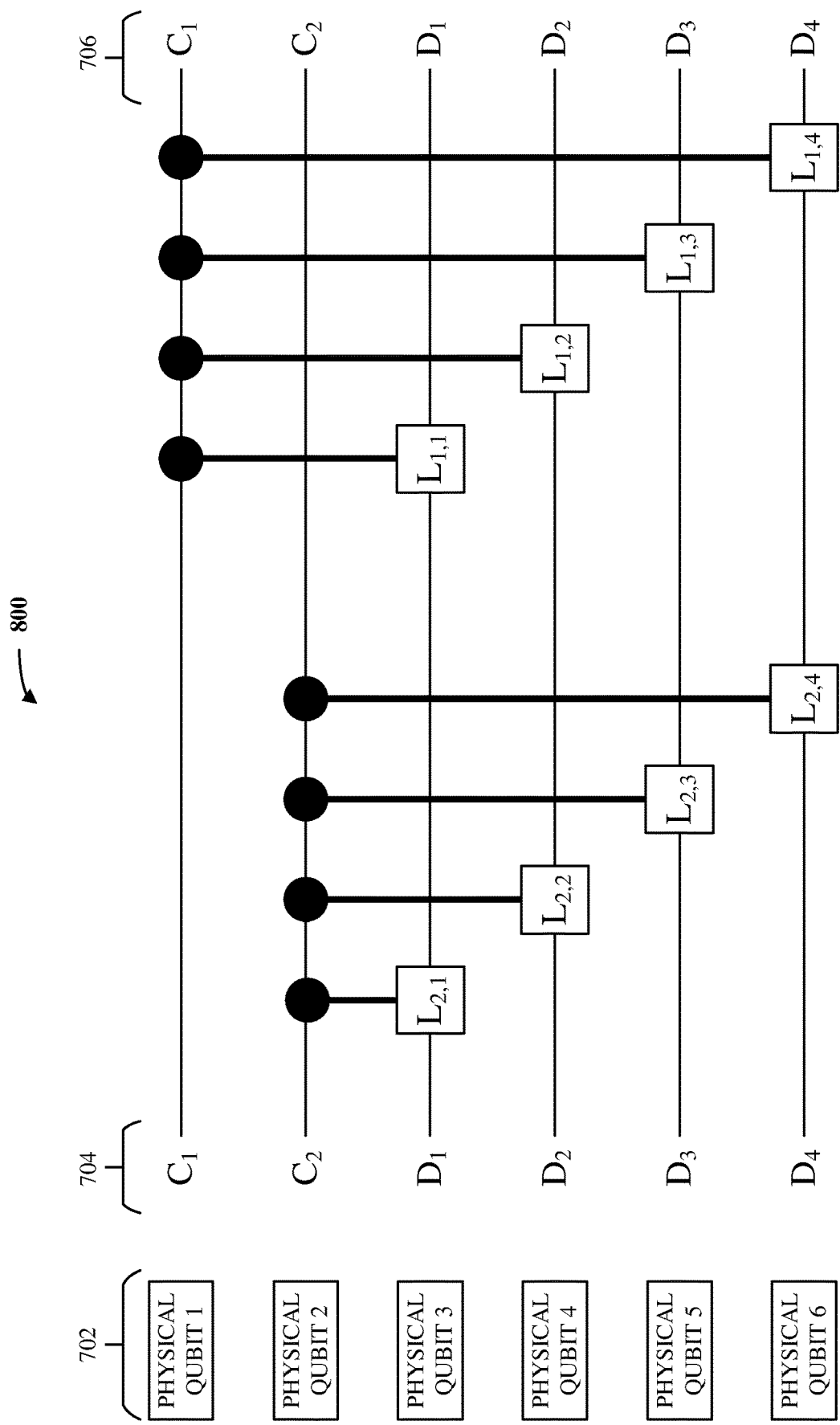
Figure 9:
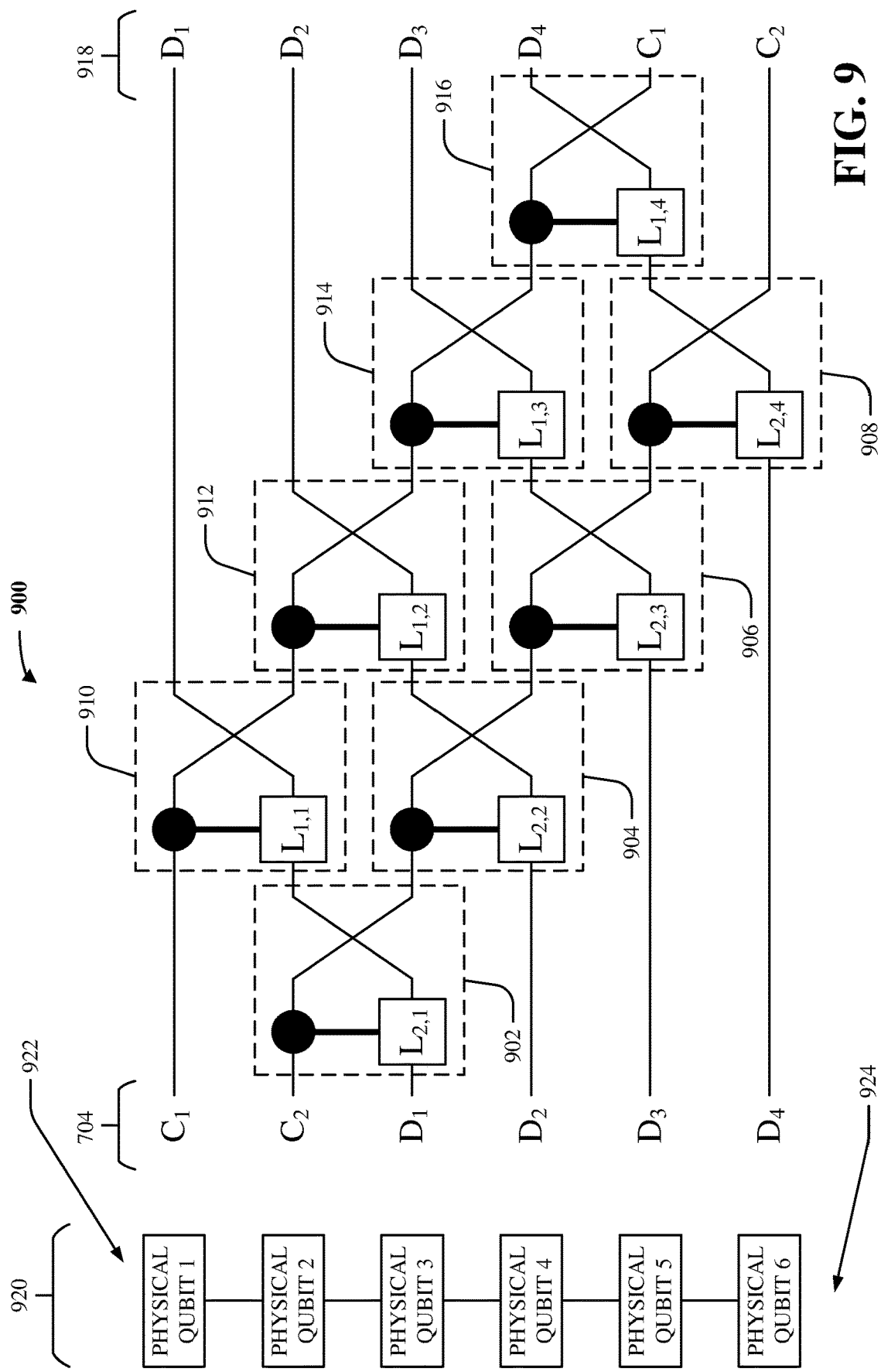

For further clarification, consider the non-limiting examples shown in FIGS. 7-9. In particular, FIGS. 7-9 illustrate example, non-limiting quantum circuit diagrams showing how left-side Pauli operators of randomized two-sided Pauli checks can be implemented with interleaved SWAP gates in accordance with one or more embodiments described herein.

First, consider FIG. 7, which illustrates an example, non-limiting quantum circuit diagram 700. As shown in the non-limiting example of FIG. 7, it can be the case that n=4. That is, there can be a total of four data qubits: $D_1$, $D_2$, $D_3$, and $D_4$. As also shown in the non-limiting example of FIG. 7, it can be the case that m=2. That is, there can be a total of two check qubits: $C_1$ and $C_2$. To support those six total qubits, and as indicated by numeral 702, the quantum computer 104 can comprise a total of six physical qubits: a physical qubit 1, a physical qubit 2, a physical qubit 3, a physical qubit 4, a physical qubit 5, and a physical qubit 6. Without loss of generality, and as indicated by numeral 704, the physical qubit 1 can initially function or act as $C_1$, the physical qubit 2 can initially function or act as $C_2$, the physical qubit 3 can initially function or act as $D_1$, the physical qubit 4 can initially function or act as $D_2$, the physical qubit 5 can initially function or act as $D_3$, and the physical qubit 6 can initially function or act as $D_4$.

Because m=2 in this non-limiting example, the set of nested, randomized two-sided Pauli checks 202 can comprise a total of two checks and thus can comprise a total of two left-side Pauli operators: $L_1$ and $L_2$. As shown, $L_1$ can operate on $D_1$, $D_2$, $D_3$, and $D_4$ and can be controlled by $C_1$. Similarly, as shown, $L_2$ can operate on $D_1$, $D_2$, $D_3$, and $D_4$ and can be controlled by $C_2$. As indicated by numeral 706, when no interleaved SWAP gates are implemented in $L_1$ and $L_2$, none of $C_1$, $C_2$, $D_1$, $D_2$, $D_3$, and $D_4$ can switch places with each other. That is, after execution of $L_1$ and $L_2$, it can still be the case that the physical qubit 1 can function or act as $C_1$, the physical qubit 2 can function or act as $C_2$, the physical qubit 3 can function or act as $D_1$, the physical qubit 4 can function or act as $D_2$, the physical qubit 5 can function or act as $D_3$, and the physical qubit 6 can function or act as $D_4$.

Now, consider FIG. 8, which illustrates an example, non-limiting quantum circuit diagram 800. As shown, the quantum circuit diagram 800 can be equivalent to the quantum circuit diagram 700, except that $L_1$ and $L_2$ can be written out in long-hand form. In particular, $L_1$ can be considered as comprising: a Pauli gate $L_{1,1}$ that targets $D_1$ and is controlled by $C_1$; a Pauli gate $L_{1,2}$ that targets $D_2$ and is controlled by $C_1$; a Pauli gate $L_{1,3}$ that targets $D_3$ and is controlled by $C_1$; and a Pauli gate $L_{1,4}$ that targets $D_4$ and is controlled by $C_1$. Similarly, as shown, $L_2$ can be considered as comprising: a Pauli gate $L_{2,1}$ that targets $D_1$ and is controlled by $C_2$; a Pauli gate $L_{2,2}$ that targets $D_2$ and is controlled by $C_2$; a Pauli gate $L_{2,3}$ that targets $D_3$ and is controlled by $C_2$; and a Pauli gate $L_{2,4}$ that targets $D_4$ and is controlled by $C_2$.

In various aspects, the quantum circuits shown in FIGS. 7 and 8 can be implemented via an all-to-all coupling topology where each of $D_1$, $D_2$, $D_3$, and $D_4$ is coupled to each of $C_1$ and $C_2$. In other words, the quantum circuits shown in FIGS. 7 and 8 can be implemented if: the physical qubit 1 is coupled to each of the physical qubits 3-6; and the physical qubit 2 is coupled to each of the physical qubits 3-6. However, the set of interleaved SWAP gates 602 can render such an all-to-all coupling topology unnecessary, as shown with respect to FIG. 9.

FIG. 9 illustrates an example, non-limiting quantum circuit diagram 900. The quantum circuit diagram 900 can be considered as a SWAP-interleaved version of the quantum circuit diagrams 700 and 800.

In various aspects, as shown by numeral 920, the physical qubits 1-6 can be coupled via a linear nearest neighbor coupling topology. Accordingly, without loss of generality, it can be the case that the physical qubit 1 (which can initially act as $C_1$) is coupled to the physical qubit 2 (which can initially act as $C_2$), which can be coupled to the physical qubit 3 (which can initially act as $D_1$), which can be coupled to the physical qubit 4 (which can initially act as $D_2$), which can be coupled to the physical qubit 5 (which can initially act as $D_3$), which can be coupled to the physical qubit 6 (which can initially act as $D_4$). Thus, the physical qubits 1-6 can be considered as forming a linear or branchless chain, where the physical qubit 1 can be located at a first physical end 922 of that chain, and where the physical qubit 6 can be located at a second physical end 924 of that chain. Moreover, $C_1$ and $C_2$ can initially be clustered in indexed order at the first physical end 922; $D_1$, $D_2$, $D_3$, and $D_4$ can initially be clustered in indexed order at the second physical end 924; and $D_1$ can be considered as initially being coupled to $C_2$.

Now, because $D_1$ and $C_2$ can be initially coupled together, entangling gates can be facilitated between $D_1$ and $C_2$. Thus, the detection component 118 can execute the $L_{2,1}$, which can target $D_1$ and be controlled by $C_1$. As shown by numeral 902, the detection component 118 can execute a SWAP gate (e.g., one of 602) on $D_1$ and $C_2$ following the execution of $L_{2,1}$. Such SWAP gate can be considered as causing $D_1$ and $C_2$ to switch places. In other words, such SWAP gate can cause $D_1$, which was previously hosted on the physical qubit 3, to instead be hosted on the physical qubit 2, and can cause $C_2$, which was previously hosted on the physical qubit 2, to instead be hosted on the physical qubit 3. In still other words, such SWAP gate can be considered as causing $D_1$ to move one positional or physical step toward the first physical end 922 and away from the second physical end 924, and such SWAP gate can conversely be considered as causing $C_2$ to move one positional or physical step toward the second physical end 924 and away from the first physical end 922. At such point (e.g., after 902), the physical qubit 1 can function or act as $C_1$, the physical qubit 2 can function or act as $D_1$, the physical qubit 3 can function or act as $C_2$, the physical qubit 4 can function or act as $D_2$, the physical qubit 5 can function or act as $D_3$, and the physical qubit 6 can function or act as $D_4$.

At such point, $C_1$ and $D_1$ can be coupled together, and $C_2$ and $D_2$ can be coupled together. Accordingly, the detection component 118 can, as shown by numeral 904, execute $L_{2,2}$ followed by a SWAP gate and can, as shown by numeral 910, execute $L_{1,1}$ followed by a SWAP gate. Such SWAP gates can update the qubit ordering in the linear topology, such that the physical qubit 1 can function or act as $D_1$, the physical qubit 2 can function or act as $C_1$, the physical qubit 3 can function or act as $D_2$, the physical qubit 4 can function or act as $C_2$, the physical qubit 5 can function or act as $D_3$, and the physical qubit 6 can function or act as $D_4$.

At such point, $C_2$ and $D_3$ can be coupled together, and $C_1$ and $D_2$ can be coupled together. Accordingly, the detection component 118 can, as shown by numeral 906, execute $L_{2,3}$ followed by a SWAP gate and can, as shown by numeral 912, execute $L_{1,2}$ followed by a SWAP gate. Such SWAP gates can update the qubit ordering in the linear topology, such that the physical qubit 1 can function or act as $D_1$, the physical qubit 2 can function or act as $D_2$, the physical qubit 3 can function or act as $C_1$, the physical qubit 4 can function or act as $D_3$, the physical qubit 5 can function or act as $C_2$, and the physical qubit 6 can function or act as $D_4$.

At such point, $C_1$ and $D_3$ can be coupled together, and $C_2$ and $D_4$ can be coupled together. Accordingly, the detection component 118 can, as shown by numeral 908, execute $L_{2,4}$ followed by a SWAP gate and can, as shown by numeral 914, execute $L_{1,3}$ followed by a SWAP gate. Such SWAP gates can update the qubit ordering in the linear topology, such that the physical qubit 1 can function or act as $D_1$, the physical qubit 2 can function or act as $D_2$, the physical qubit 3 can function or act as $D_3$, the physical qubit 4 can function or act as $C_1$, the physical qubit 5 can function or act as $D_4$, and the physical qubit 6 can function or act as $C_2$.

At such point, $C_1$ and $D_4$ can be coupled together. Accordingly, the detection component 118 can, as shown by numeral 916, execute $L_{1,4}$ followed by a SWAP gate. As shown by numeral 918, such SWAP gate can update the qubit ordering in the linear topology, such that the physical qubit 1 can function or act as $D_1$, the physical qubit 2 can function or act as $D_2$, the physical qubit 3 can function or act as $D_3$, the physical qubit 4 can function or act as $D_4$, the physical qubit 5 can function or act as $C_1$, and the physical qubit 6 can function or act as $C_2$.

The SWAP gates shown in FIG. 9 can be considered belonging to the set of interleaved SWAP gates 602.

Note that the set of interleaved SWAP gates 602 can have caused each of $C_1$ and $C_2$ to move four positional or physical steps (e.g., one step per data qubit) away from the first physical end 922 and toward the second physical end 924. Conversely, note that the set of interleaved SWAP gates 602 can have caused each of $D_1$, $D_2$, $D_3$, and $D_4$ to move two positional or physical steps (e.g., one step per check qubit) away from the second physical end 924 and toward the first physical end 922. In other words, the set of interleaved SWAP gates 602 can cause $C_1$, $C_2$, $D_1$, $D_2$, $D_3$, and $D_4$ to respectively and physically stair-step across the physical qubits 1-6, so that each data qubit can become coupled to each check qubit at some point in time.

Note that, although FIGS. 7-9 pertain to left-side Pauli operators for situations in which m=2 and n=4, this is a mere non-limiting example for ease of illustration and explanation. In various aspects, the teachings and concepts described with respect to FIGS. 7-9 can be extended to right-side Pauli operators and to any suitable values of n and m.

Furthermore, note that the interleaved SWAP gates shown in FIG. 9 can allow the quantum circuit diagram 900 to be executed in a total of five time steps (not to be confused with the above-mentioned positional or physical steps). In particular, numeral 902 can be performed during a first time step, numerals 904 and 910 can be performed concurrently during a second time step, numerals 906 and 912 can be performed concurrently during a third time step, numerals 908 and 914 can be performed concurrently during a fourth time step, and numeral 916 can be performed during a fifth time step. More generally, when outfitted with the set of interleaved SWAP gates 602, the left-side Pauli operators of the set of nested, randomized two-sided Pauli checks 202 can be executed in n+m−1 time steps. Analogously, when outfitted with the set of interleaved SWAP gates 602, the right-side Pauli operators of the set of nested, randomized two-sided Pauli checks 202 can also be executed in n+m−1 time steps.

As explained above, a respective or unique one of the set of interleaved SWAP gates 602 can follow each controlled Pauli gate (e.g., $L_{1,1}$, $L_{1,2}$) of the set of nested, randomized two-sided Pauli checks 202. Such placement or arrangement of SWAP gates can be considered as more efficient than other possible placements or arrangements of SWAP gates. For example, another possible placement or arrangement can include executing multiple SWAP gates prior to any given controlled Pauli gate, so that the target qubit and control qubit of that given controlled Pauli gate are coupled neighbors, and repeating such procedure for every controlled Pauli gate of a two-sided Pauli check. Although such an alternative placement or arrangement of SWAP gates would allow a randomized two-sided Pauli check to be performed without an all-to-all coupling topology, it would require a significantly larger number of SWAP gates as compared to the set of interleaved SWAP gates 602. Indeed, the set of interleaved SWAP gates 602 can be implemented with one SWAP gate per controlled Pauli gate. In stark contrast, the above-mentioned alternative placement or arrangement of SWAP gates could instead require multiple or varying numbers of SWAP gates per controlled Pauli gate.

Not only can the set of interleaved SWAP gates 602 involve significantly less swapping than such alternative placements or arrangements of SWAP gates, but the set of interleaved SWAP gates 602 can also involve significantly fewer Controlled-Not gates. Various non-limiting aspects are described with respect to FIG. 10.

FIG. 10 illustrates various quantum circuit equivalences that can be applied to interleaved SWAP gates in accordance with one or more embodiments described herein.

As shown by numeral 1002, a SWAP gate can be considered as equivalent to three Controlled-Not gates in series, where the middle Controlled-Not gate is targeted at the control qubit of the other two Controlled-Not gates. Thus, a SWAP gate can normally be considered as having a Controlled-Not cost of three. However, as shown by numerals 1004, 1006, and 1008, a SWAP gate that directly follows a controlled Pauli gate can instead be considered as having a Controlled-Not cost of two. In particular, the numeral 1004 shows such an equivalency for a Controlled-Not gate followed by a SWAP gate. Similarly, the numeral 1006 shows such an equivalency for a Controlled-Z gate followed by a SWAP gate. Likewise, the numeral 1008 shows such an equivalency for a Controlled-Y gate followed by a SWAP gate. Such Controlled-Not-saving equivalencies can be implemented for each of the set of interleaved SWAP gates 602 (e.g., after all, each of 602 can follow a controlled Pauli gate and can thus be simplified by one numeral 1004, 1006, or 1008). In stark contrast, such Controlled-Not-saving equivalencies cannot necessarily be implemented for alternative placements or arrangements of SWAP gates. Accordingly, those alternative placements or arrangements of SWAP gates can have significantly higher Controlled-Not costs, which can be undesirable.

Note that the quantum circuit equivalences (or analogous versions thereof) shown in FIG. 10 can be applied to left-side Pauli operators or to right-side Pauli operators, as appropriate.

Furthermore, although the set of interleaved SWAP gates 602 are mainly described as being applicable to physical qubits that are physically arranged in a linear nearest neighbor coupling topology, this is a mere non-limiting example for ease of illustration and explanation. In various embodiments, physical qubits can be coupled using any suitable topology. As long as such topology encompasses (e.g., is more general than) a linear nearest neighbor coupling topology, the set of interleaved SWAP gates 602 can be implemented. For clarification, suppose that physical qubits are coupled together is some particular topology. That particular topology can be considered as a graph, where nodes of the graph respectively represent physical qubits, and where edges of the graph respectively represent physical connections between physical qubits. If that graph contains any sub-graph that forms or amounts to a linear or branchless chain, then the set of interleaved SWAP gates 602 can be implemented on that particular topology (e.g., can be implemented on whatever physical qubits and physical couplings make up that sub-graph).

Figure 11:
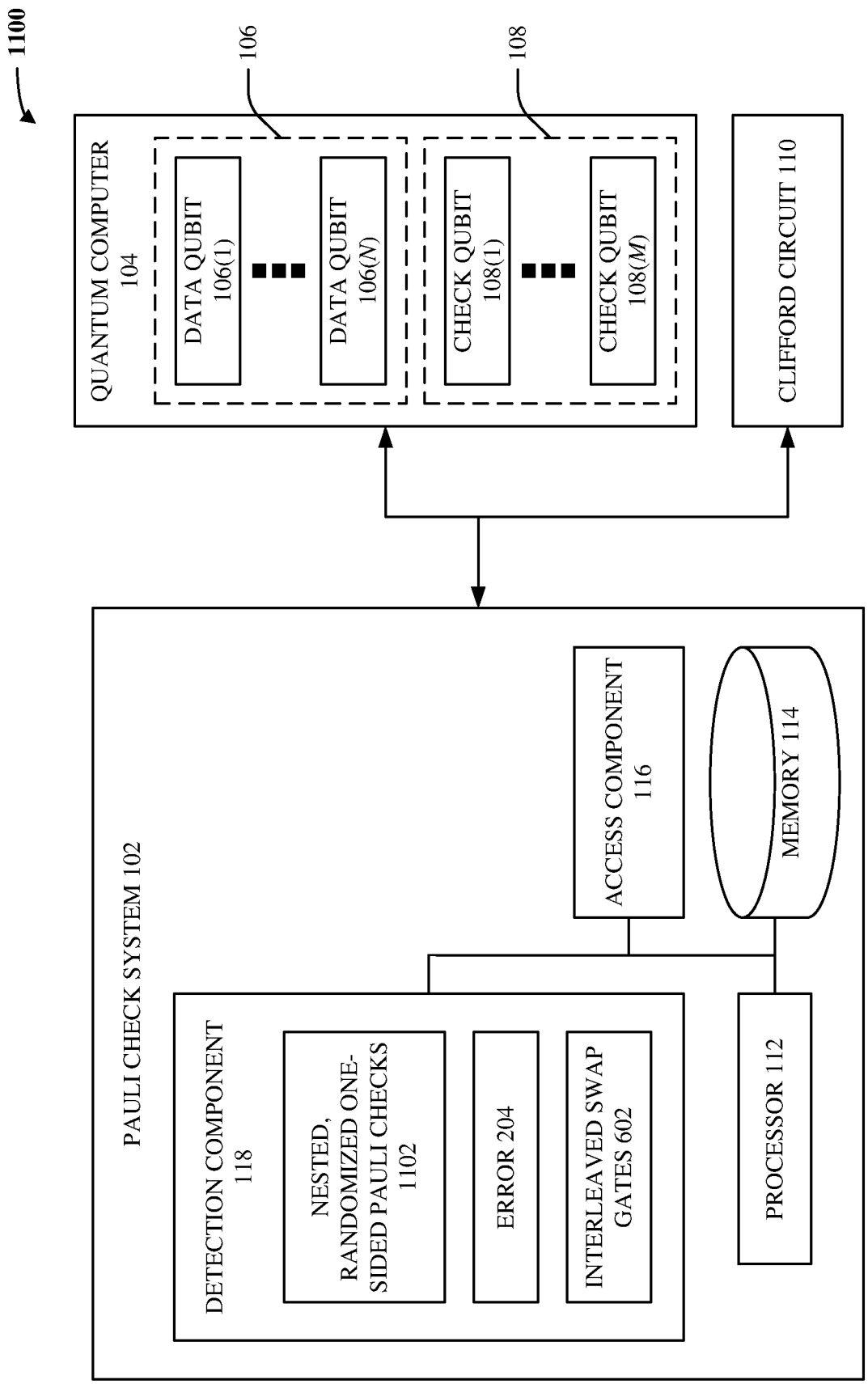
FIG. 11 illustrates a block diagram of an example, non-limiting system including a set of nested, randomized one-sided Pauli checks that facilitates improved single-shot error mitigation for Clifford circuits in accordance with one or more embodiments described herein.

FIG. 11 illustrates a block diagram of an example, non-limiting system 1100 including a set of nested, randomized one-sided Pauli checks that can facilitate improved single-shot error mitigation for Clifford circuits in accordance with one or more embodiments described herein. As shown, the system 1100 can, in some cases, comprise the same components as the system 600, but can comprise a set of nested, randomized one-sided Pauli checks 1102 instead of the set of nested, randomized two-sided Pauli checks 202.

In various aspects, the set of nested, randomized one-sided Pauli checks 1102 can respectively correspond (e.g., in one-to-one fashion) to the set of check qubits 108. Accordingly, since the set of check qubits 108 can comprise m qubits, the set of nested, randomized one-sided Pauli checks 1102 can comprise m Pauli checks: a first randomized one-sided Pauli check to an m-th randomized one-sided Pauli check. In various instances, each randomized one-sided Pauli check can operate on the set of data qubits 106, can be leftward of the Clifford circuit 110, and can be controlled by a respective one of the set of check qubits 108. In other words, each randomized one-sided Pauli check can comprise an n-qubit Pauli operator that is positioned on a left (e.g., upstream) side of the Clifford circuit 110 and that is controlled by a respective one of the set of check qubits 108. In various cases, such Pauli operators can be selected based on commutation rules that relate the Clifford circuit 110 to n-qubit, Z-type Pauli operators that are randomly selected without replacement. In various aspects, the detection component 118 can electronically execute the set of nested, randomized one-sided Pauli checks 1102 and the Clifford circuit 110 on the quantum computer 104, and resulting measured states of the set of check qubits 108 can be leveraged to determine whether or not the error 204 associated with the Clifford circuit 110 was detected. In various cases, the detection component 118 can repeatedly execute the Clifford circuit 110 and the set of nested, randomized one-sided Pauli checks 1102, until the error 204 is not detected. Various non-limiting aspects are described with respect to FIGS. 11-16.

Figure 12:
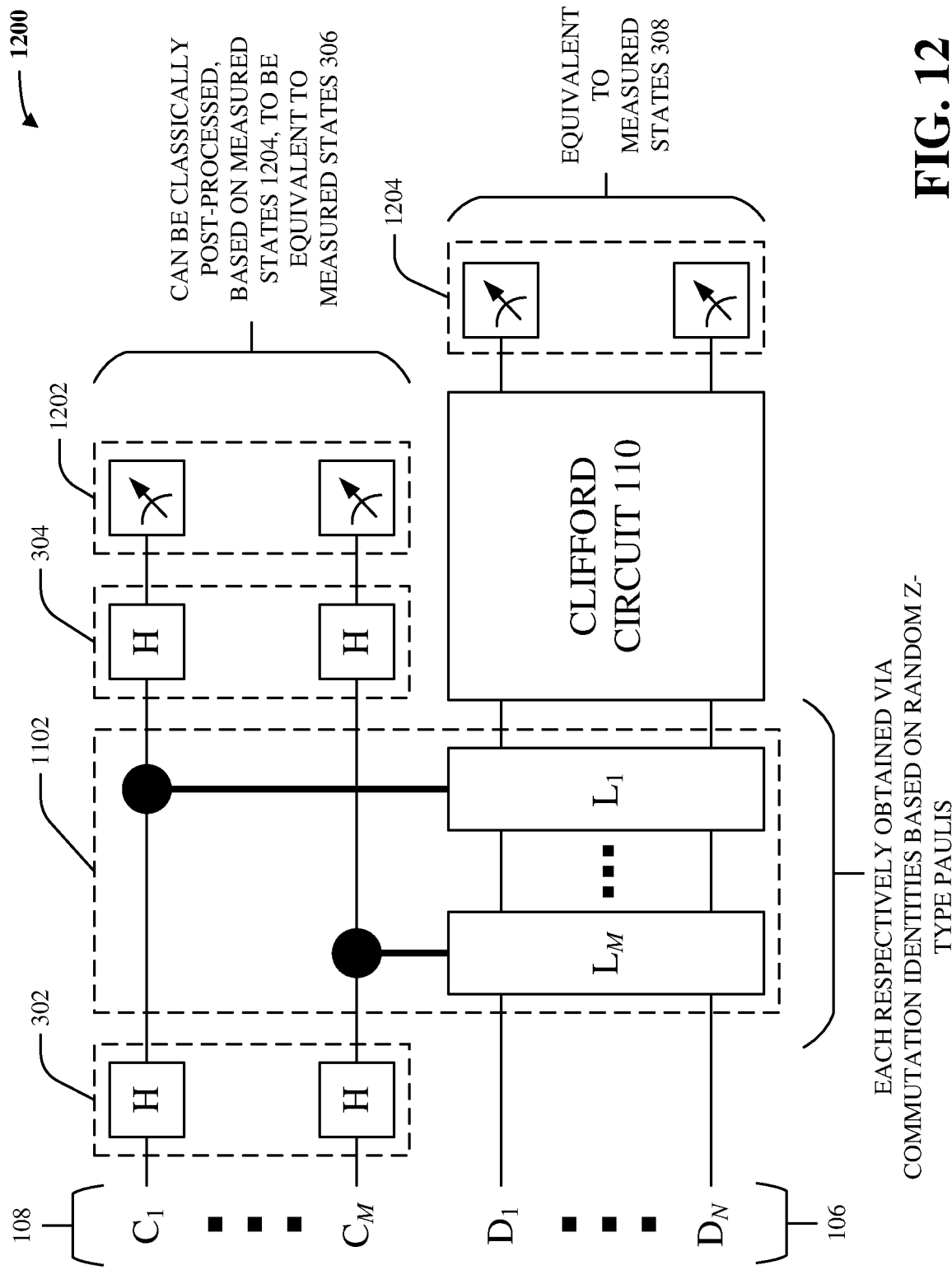
FIG. 12 illustrates an example, non-limiting quantum circuit diagram showing how a set of nested, randomized one-sided Pauli checks can be implemented to mitigate errors associated with a Clifford circuit in accordance with one or more embodiments described herein.

FIG. 12 illustrates an example, non-limiting quantum circuit diagram 1200 showing how the set of nested, randomized one-sided Pauli checks 1102 can be implemented to mitigate errors associated with the Clifford circuit 110 in accordance with one or more embodiments described herein.

As shown, the quantum circuit diagram 1200 can be nearly the same as the quantum circuit diagram 300, except that the right-side Pauli operators $R_1$ to $R_m$ can be omitted and the left-side Pauli operators $L_1$ to $L_m$ can be selected differently. In particular, the left-side Pauli operators $L_1$ to $L_m$ can be indirectly selected based on $\mathcal{Z}_n$, where $\mathcal{Z}_n$ can represent the total set of all possible n-qubit, Z-type Pauli operators. That is, $\mathcal{Z}_n \equiv \omega\{I, Z\}^{\otimes n}$, where I can be the single-qubit identity gate, where Z can be the single-qubit Pauli-Z gate, and where $\omega \in \{\pm 1\}$ can be a phase factor.

As mentioned above, the set of nested, randomized one-sided Pauli checks 1102 can respectively correspond (e.g., in one-to-one fashion) with the set of check qubits 108, such that there can be one respective or unique randomized one-sided Pauli check per check qubit.

As a non-limiting example, $L_1$, which can be controlled by the check qubit 108(1), can itself be considered as a first randomized one-sided Pauli check of the set of nested, randomized one-sided Pauli checks 1102. In various aspects, $L_1$ can be not randomly selected without replacement from $\mathcal{P}_n \backslash \{I^{\otimes n}\}$. Instead, $R_1$ (even though it is omitted) can be selected randomly from $\mathcal{Z}_n \backslash \{I^{\otimes n}\}$. When given $R_1$, commutation rules can be used to identify $L_1$. For instance, $L_1 = U_1^\dagger R_1 U_1$, where $U_1 \in \mathcal{C}_n$ can represent whatever quantum gates would be sandwiched between $L_1$ and $R_1$ if the right-side Pauli operators $R_1$ to $R_m$ were not omitted. As shown, only the Clifford circuit 110 would be sandwiched in between $L_1$ and $R_1$, and so $U_1$ can be considered as representing the Clifford circuit 110.

As another non-limiting example, $L_2$ (not shown), which can be controlled by the check qubit 108(2) (not shown), can itself be considered as a second randomized one-sided Pauli check of the set of nested, randomized one-sided Pauli checks 1102. In various aspects, $L_2$ can be not randomly selected from $\mathcal{P}_n \backslash \{I^{\otimes n}, L_1\}$. Instead, $R_2$ (even though it is omitted) can be selected randomly from $\mathcal{Z}_n \backslash \{I^{\otimes n}, R_1\}$. When given $R_2$, commutation rules can be used to identify $L_2$. For instance, $L_2 = U_2^\dagger R_2 U_2$, where $U_2 \in \mathcal{C}_n$ can represent whatever quantum gates would be sandwiched between $L_2$ and $R_2$ if the right-side Pauli operators $R_1$ to $R_m$ were not omitted. As shown, $L_1$, the Clifford circuit 110, and $R_1$ would be sandwiched in between $L_2$ and $R_2$, and so $U_2$ can be considered as representing $L_1$, the Clifford circuit 110, and $R_1$.

Continuing in this fashion, and as yet another non-limiting example, $L_m$, which can be controlled by the check qubit 108(m), can itself be considered as an m-th randomized one-sided Pauli check of the set of nested, randomized one-sided Pauli checks 1102. In various aspects, $L_m$ can be not randomly selected from $\mathcal{P}_n \backslash \{I^{\otimes n}, L_1, \ldots, L_{m-1}\}$. Instead, $R_m$ (even though it is omitted) can be selected randomly from $\mathcal{Z}_n \backslash \{I^{\otimes n}, R_1, \ldots, R_{m-1}\}$. When given $R_m$, commutation rules can be used to identify $L_m$. For instance, $L_m = U_m^\dagger R_m U_m$, where $U_m \in \mathcal{C}_n$ can represent whatever quantum gates would be sandwiched between $L_m$ and $R_m$ if the right-side Pauli operators $R_1$ to $R_m$ were not omitted. As shown, the m−1 previous left-side Pauli operators (e.g., $L_1$ to $L_{m-1}$), the Clifford circuit 110, and the m−1 previous right-side Pauli operators (e.g., $R_1$ to $R_{m-1}$) would be sandwiched in between $L_m$ and $R_m$. Accordingly, $U_m$ can be considered as representing the m−1 previous left-side Pauli operators, the Clifford circuit 110, and the m−1 previous right-side Pauli operators.

In various cases, as shown, the detection component 118 can execute the Clifford circuit 110 and the set of nested, randomized one-sided Pauli checks 1102 on the quantum computer 104. After such execution, the detection component 118 can measure the resulting quantum states of the set of check qubits 108, thereby yielding a set of measured states 1202. Likewise, after such execution, the detection component 118 can measure the resulting quantum states of the set of data qubits 106, thereby yielding a set of measured states 1204. In some instances, the set of measured states 1204 can be performed or otherwise conducted with respect to the Z basis (e.g., as opposed to an X-basis).

In various aspects, as mentioned above, the left-side Pauli operators $L_1$ to $L_m$ can be obtained via commutation relations based on random, Z-type Pauli operators. This can cause the set of measured states 1204 to be equivalent to the set of measured states 308. Moreover, this can also cause the set of measured states 1202 to be classically post-processible so as to become equivalent to the set of measured states 306. In various aspects, such classical post-processing can include applying to the set of measured states 1202 one or more Exclusive-OR Boolean operations that are conditioned on the set of measured states 1204.

More specifically, because the right-side Pauli operators $R_1$ to $R_m$ can be randomly selected without replacement from $\mathcal{Z}_n \backslash \{I^{\otimes n}\}$, the controlled Pauli gates of those right-side Pauli operators can be simplified either to identity gates or to Controlled-Not gates that target respective ones of the set of check qubits 108. Such identity gates and Controlled-Not gates can refrain from changing or altering the quantum states of the set of data qubits 106, hence why the set of measured states 1204 (obtained when the right-side Pauli operators $R_1$ to $R_m$ are omitted) can be equivalent to the set of measured states 308 (obtained when the right-side Pauli operators $R_1$ to $R_m$ are not omitted). Furthermore, such identity gates and Controlled-Not gates can change or alter the quantum states of the set of check qubits 108 in purely classical ways (e.g., indeed, via Exclusive-OR Boolean operations), hence why the set of measured states 1202 (obtained when the right-side Pauli operators $R_1$ to $R_m$ are omitted) can be classically post-processed to become equivalent to the set of measured states 306 (obtained when the right-side Pauli operators $R_1$ to $R_m$ are not omitted).

For further clarification regarding how a randomized two-sided Pauli check can be simplified into a randomized one-sided Pauli check, consider the non-limiting examples shown with respect to FIGS. 13-17.

FIGS. 13-17 illustrate example, non-limiting quantum circuit diagrams showing how a randomized two-sided Pauli check can be converted into a randomized one-sided Pauli check in accordance with one or more embodiments described herein.

Figure 13:
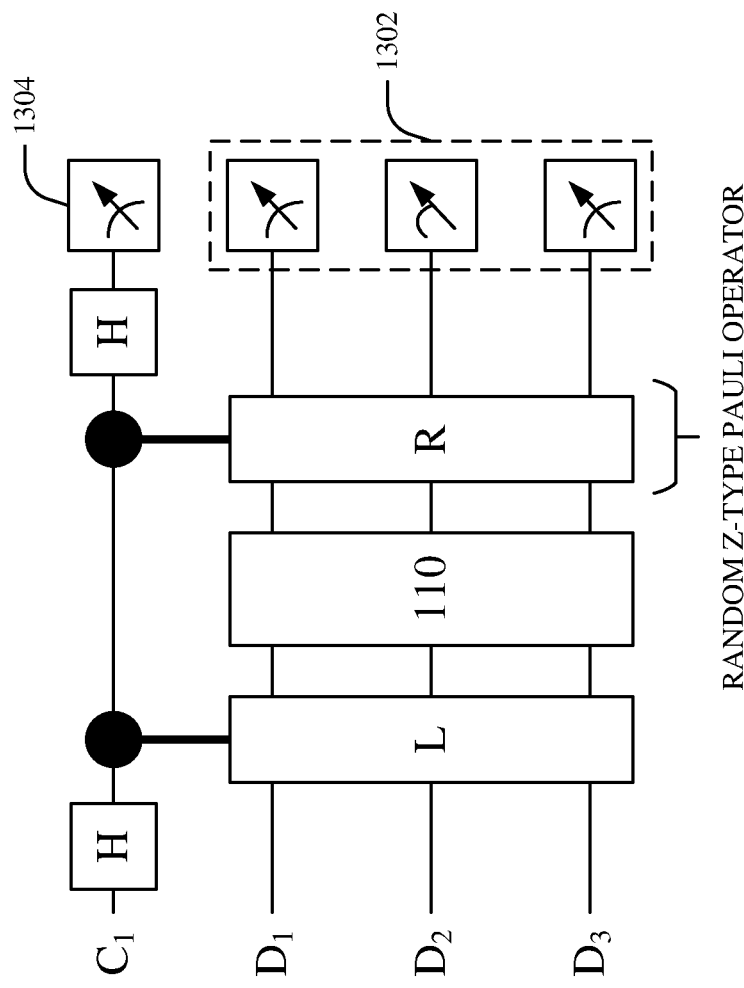
FIGS. 13-17 illustrate example, non-limiting quantum circuit diagrams showing how a randomized two-sided Pauli check can be converted into a randomized one-sided Pauli check in accordance with one or more embodiments described herein.

First, consider FIG. 13, which depicts an example, non-limiting quantum circuit diagram 1300. In the non-limiting example of FIG. 13, it can be the case that n=3 and m=1 (these are non-limiting values for purposes of illustration and explanation). That is, the set of data qubits 106 can comprise a total of three data qubits: $D_1$, $D_2$, and $D_3$; and the set of check qubits 108 can comprise a total of one check qubit: $C_1$. As shown, the quantum circuit diagram 1300 includes a single two-sided Pauli check having a 3-qubit left-side Pauli operator denoted as L and a 3-qubit right-side Pauli operator denoted as R. In various aspects, R can be selected randomly from $\mathcal{Z}_n \backslash \{I^{\otimes n}\}$, and L can be identified via commutation relations, as described above. As also shown, $C_1$ can be outfitted with Hadamard gates before L and after R (e.g., so as to be placed into an X-basis for measurement), as described above.

In various aspects, the two-sided Pauli check shown in FIG. 13 can be executed. After such execution, the quantum state of $C_1$ can be measured, thereby yielding a measured state 1304. Likewise, after such execution, the quantum states of $D_1$, $D_2$, and $D_3$ can be measured, thereby yielding a set of measured states 1302. In various instances, and as described above, the measured state 1304 can be considered as indicating whether or not an error (e.g., 204) has tainted the set of measured states 1302 (e.g., has made the set of measured states 1302 unreliable or inaccurate).

Figure 14:
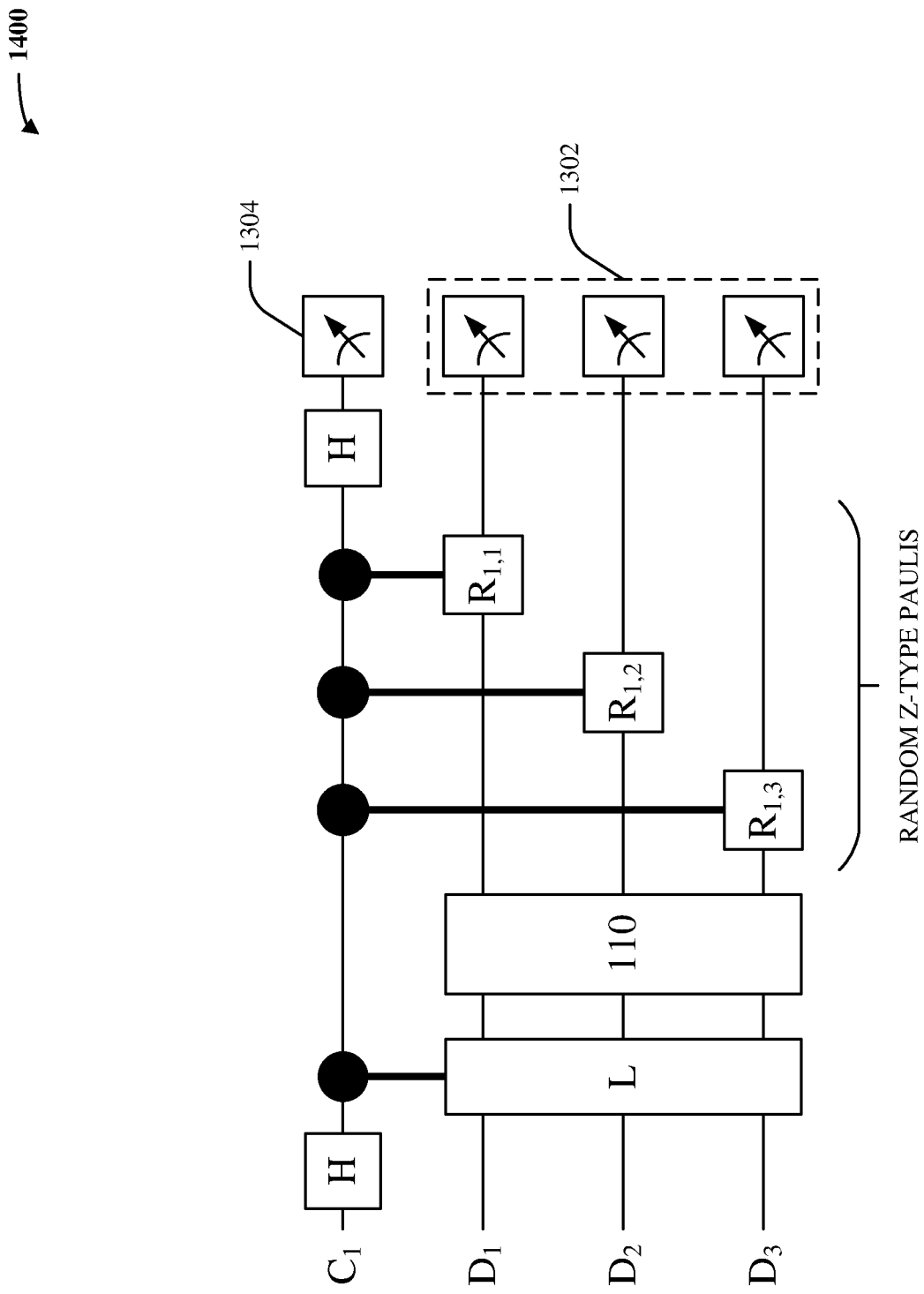

Now, consider FIG. 14, which depicts an example, non-limiting quantum circuit diagram 1400. As shown, the quantum circuit diagram 1400 can be the same as the quantum circuit diagram 1300, except that the right-side Pauli operator R can be written in long-hand form. In particular, because n=3 in this non-limiting example, R can be composed of three controlled Pauli gates: a Pauli gate $R_{1,3}$ that targets $D_3$ and that is controlled by $C_1$; a Pauli gate $R_{1,2}$ that targets $D_2$ and that is controlled by $C_1$; and a Pauli gate $R_{1,1}$ that targets $D_1$ and that is controlled by $C_1$. Because R can be selected randomly from $\mathcal{Z}_n \backslash \{I^{\otimes n}\}$, it can be the case that each of $R_{1,3}$, $R_{1,2}$, and $R_{1,1}$ are random Z-type Pauli gates. That is, $R_{1,3}$ can be either an identity gate or a Pauli-Z gate, $R_{1,2}$ can be either an identity gate or a Pauli-Z gate, and $R_{1,1}$ can be either an identity gate or a Pauli-Z gate.

Figure 15:
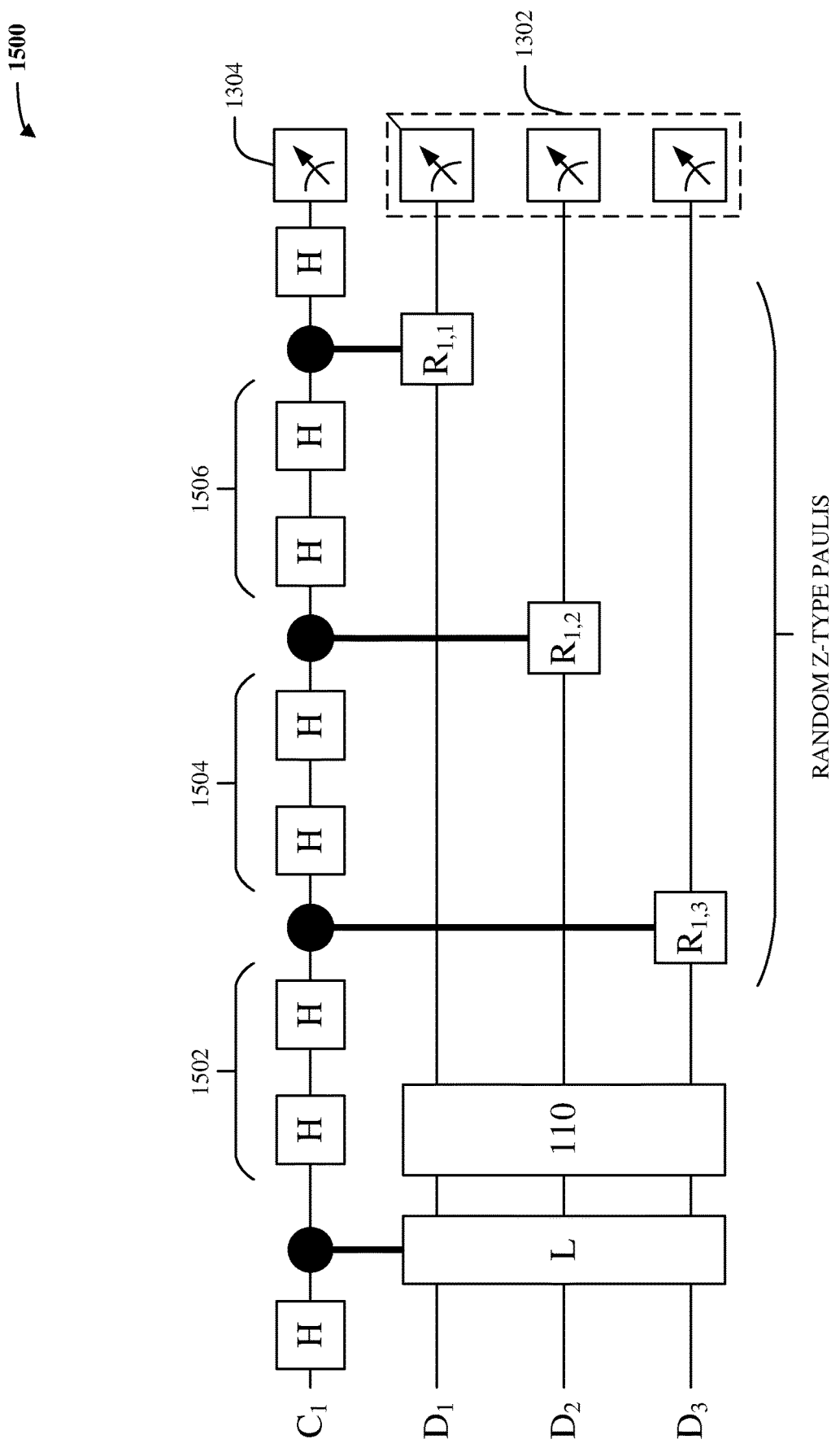

Next, consider FIG. 15, which depicts an example, non-limiting quantum circuit diagram 1500. As shown, the quantum circuit diagram 1500 can be nearly the same as the quantum circuit diagram 1300, except that pairs of Hadamard gates can be inserted, onto $C_1$, leftward (e.g., upstream) of each controlled Pauli gate of R. In particular, a pair of Hadamard gates 1502 can be inserted on $C_1$ just upstream of $R_{1,3}$. Similarly, a pair of Hadamard gates 1504 can be inserted on $C_1$ just upstream of $R_{1,2}$. Likewise, a pair of Hadamard gates 1506 can be inserted on $C_1$ just upstream of $R_{1,1}$. Note that, since the Hadamard gate is its own inverse, each of such pairs of Hadamard gates can be considered as amounting to an identity gate. Accordingly, the quantum circuit diagram 1500 can be substantively equivalent to the quantum circuit diagrams 1400 and 1300.

Figure 16:
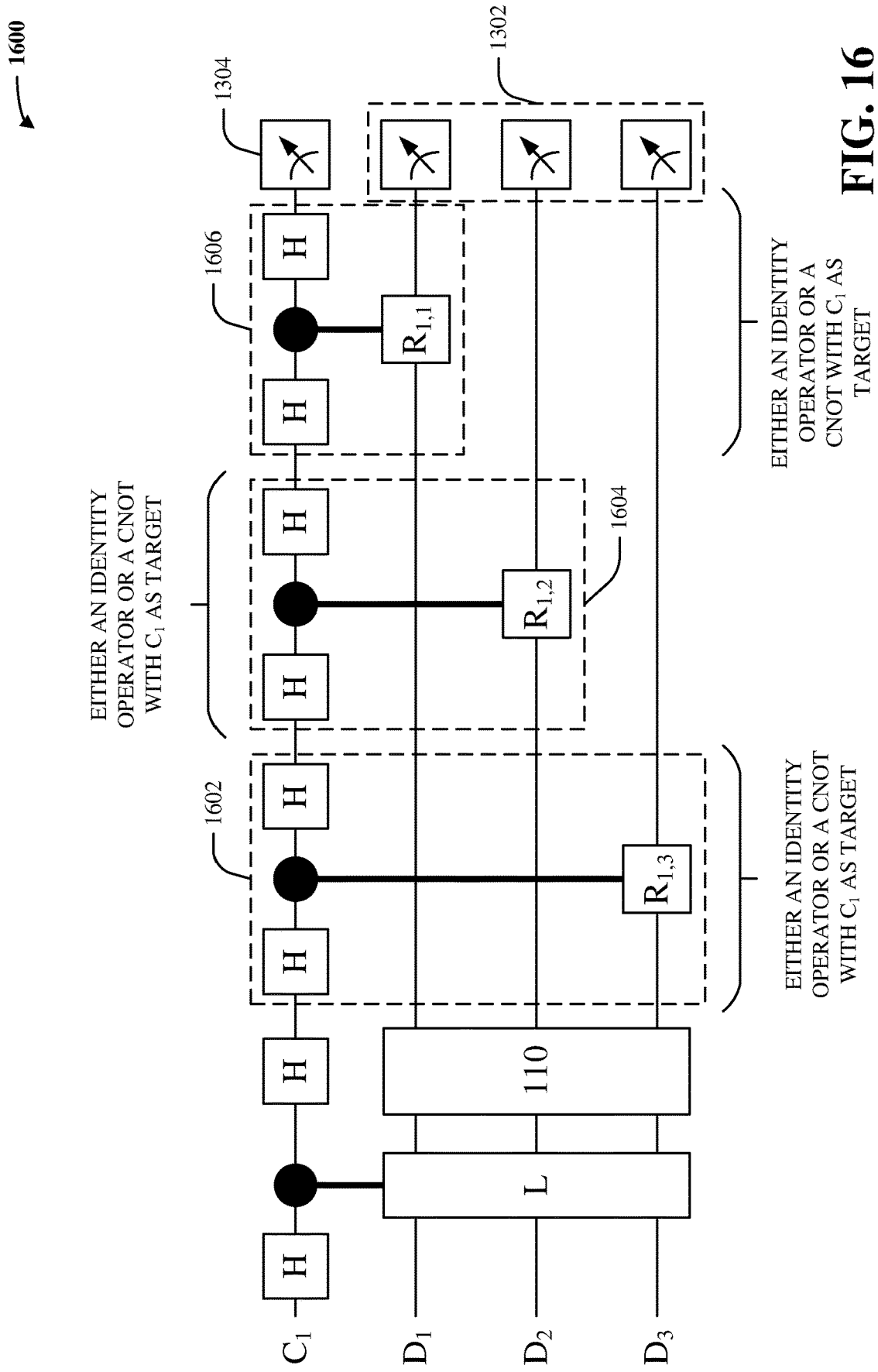

Now, consider FIG. 16, which depicts an example, non-limiting quantum circuit diagram 1600. As shown, the quantum circuit diagram 1600 can be the same as the quantum circuit diagram 1500, except that various quantum gates can be associatively grouped together for purposes of explanation.

Note that one Hadamard gate from the pair of Hadamard gates 1502, one Hadamard gate from the pair of Hadamard gates 1504, and $R_{1,3}$ can be associatively grouped together, as shown by numeral 1602. As mentioned above, $R_{1,3}$ can be either an identity gate or a Pauli-Z gate. If $R_{1,3}$ is an identity gate, then the numeral 1602 can be equivalent to a two-qubit identity operator that does not alter $C_1$ and that does not alter $D_3$. On the other hand, if $R_{1,3}$ is a Pauli-Z gate, then the numeral 1602 can instead be equivalent to a Controlled-Not gate that targets $C_1$ and that is controlled by $D_3$. In either case, the numeral 1602 can refrain from altering the quantum state of $D_3$ and can at most alter the quantum state of $C_1$ in a purely classical fashion (e.g., a Controlled-Not gate can be classically performed via an Exclusive-OR Boolean operation).

Similarly, note that one Hadamard gate from the pair of Hadamard gates 1504, one Hadamard gate from the pair of Hadamard gates 1506, and $R_{1,2}$ can be associatively grouped together, as shown by numeral 1604. As mentioned above, $R_{1,2}$ can be either an identity gate or a Pauli-Z gate. If $R_{1,2}$ is an identity gate, then the numeral 1604 can be equivalent to a two-qubit identity operator that does not alter $C_1$ and that does not alter $D_2$. On the other hand, if $R_{1,2}$ is a Pauli-Z gate, then the numeral 1604 can instead be equivalent to a Controlled-Not gate that targets $C_1$ and that is controlled by $D_2$. In either case, the numeral 1604 can refrain from altering the quantum state of $D_2$ and can at most alter the quantum state of $C_1$ in a purely classical fashion (e.g., a Controlled-Not gate can be classically performed via an Exclusive-OR Boolean operation).

Likewise, note that one Hadamard gate from the pair of Hadamard gates 1506, one of the Hadamard gates with which $C_1$ was initially outfitted, and $R_{1,1}$ can be associatively grouped together, as shown by numeral 1606. As mentioned above, $R_{1,1}$ can be either an identity gate or a Pauli-Z gate. If $R_{1,1}$ is an identity gate, then the numeral 1606 can be equivalent to a two-qubit identity operator that does not alter $C_1$ and that does not alter $D_1$. On the other hand, if $R_{1,1}$ is a Pauli-Z gate, then the numeral 1606 can instead be equivalent to a Controlled-Not gate that targets $C_1$ and that is controlled by $D_1$. In either case, the numeral 1606 can refrain from altering the quantum state of $D_1$ and can at most alter the quantum state of $C_1$ in a purely classical fashion (e.g., a Controlled-Not gate can be classically performed via an Exclusive-OR Boolean operation).

Figure 17:
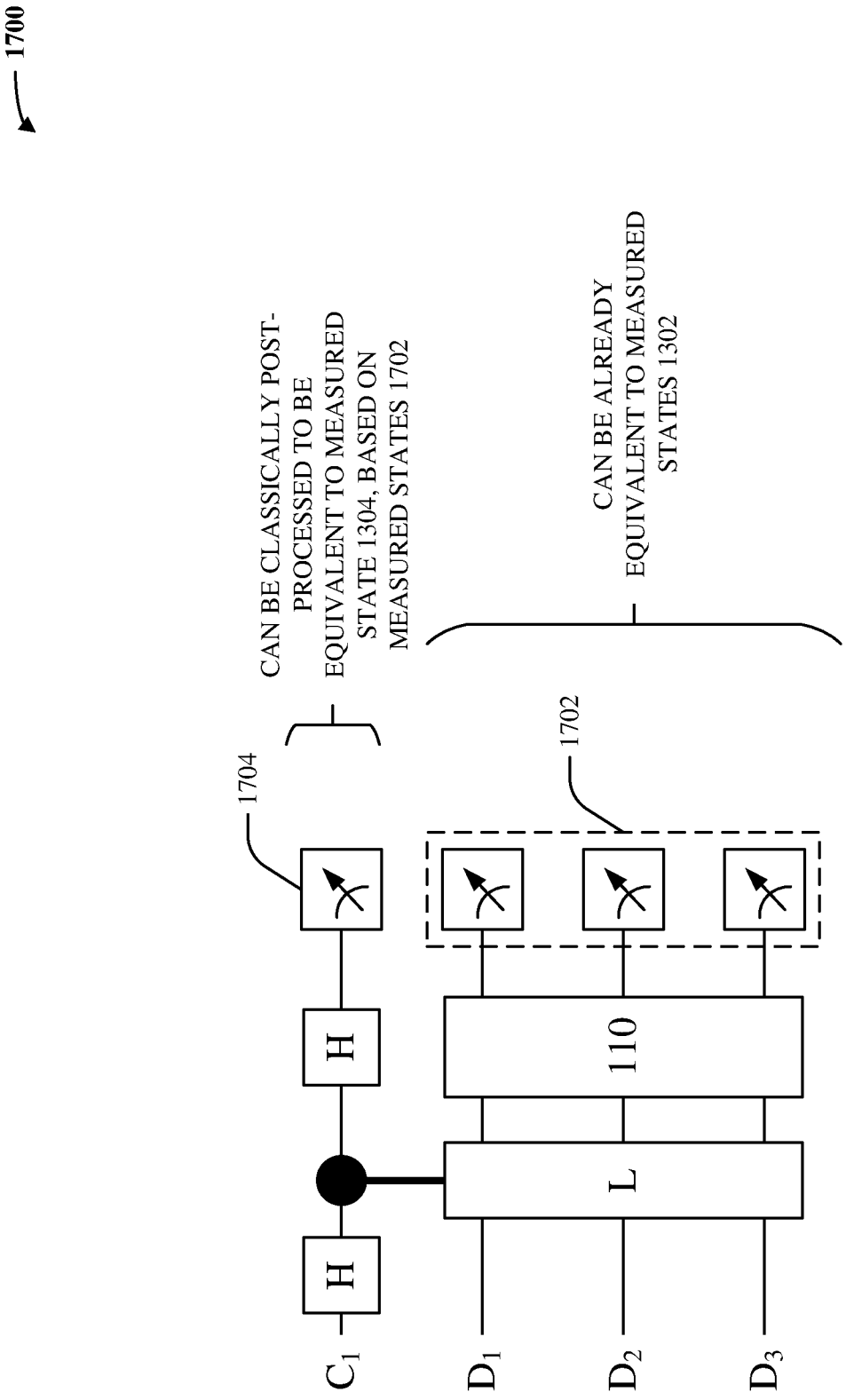

Now, consider FIG. 17, which depicts an example, non-limiting quantum circuit diagram 1700. As shown, the quantum circuit diagram 1700 can be the same as the quantum circuit diagram 1600, except that the associatively grouped quantum gates denoted by numerals 1602, 1604, and 1606 can be omitted.

In various aspects, as shown, such omission can cause the quantum circuit diagram 1700 to depict a one-sided Pauli check (e.g., L can be upstream of the Clifford circuit 110 and can be controlled by $C_1$ which can be outfitted with Hadamard gates before and after L, and R can be omitted).

In various instances, the one-sided Pauli check shown in FIG. 17 can be executed. After such execution, the quantum state of $C_1$ can be measured, thereby yielding a measured state 1704. Likewise, after such execution, the quantum states of $D_1$, $D_2$, and $D_3$ can be measured, thereby yielding a set of measured states 1702.

As mentioned above, the associatively grouped quantum gates denoted by numerals 1602, 1604, and 1606 can either amount to two-qubit identity gates or to Controlled-Not gates that target $C_1$. In any of these cases, such associatively grouped quantum gates can refrain from affecting $D_1$, $D_2$, and $D_3$. Therefore, the set of measured states 1702 can be equivalent to the set of measured states 1302. In other words, when R is selected randomly from $\mathcal{Z}_n \setminus \{I^{\otimes n}\}$, R can have no effect on the set of data qubits 106.

Moreover, because the associatively grouped quantum gates denoted by numerals 1602, 1604, and 1606 can either amount to two-qubit identity gates or to Controlled-Not gates that target $C_1$, such associatively grouped quantum gates can, at most, affect $C_1$ in a solely classical fashion (e.g., via Exclusive-OR Boolean operations). Therefore, although the measured state 1704 can be not equivalent to the measured state 1304, the measured state 1704 can nevertheless be classically post-processed so as to become equivalent to the measured state 1304. In particular, depending upon how many of the numerals 1602, 1604, and 1606 amount to Controlled-Not gates that target $C_1$, one or more Exclusive-OR Boolean operations that are conditioned on the set of measured states 1702 can be applied to the measured state 1704. Thus, the measured state 1304 (which can indicate whether or not the error 204 occurred) can nevertheless be obtained, even in the absence of the right-side Pauli operator R.

Note that FIGS. 11-16 show non-limiting examples of how a single two-sided Pauli check can be converted into a single one-sided Pauli check for n=3 and m=1. However, this is a mere non-limiting example for ease of explanation and illustration. In various aspects, such teachings and concepts can be extrapolated to any suitable number of Pauli checks and for any suitable values of n and m. Thus, a set of nested two-sided Pauli checks (e.g., 202) can be converted into a set of nested one-sided Pauli checks (e.g., 1102).

In various instances, one-sided Pauli checks can be considered as having various advantages over two-sided Pauli checks. Indeed, in some cases, a one-sided Pauli check can be considered as having a significantly lower quantum computational overhead (e.g., nearly half of the quantum gates of a two-sided Pauli check can be omitted in a one-sided Pauli check, and Exclusive-OR Boolean operations can be easy to implement classically). Moreover, in some cases, error detection of a one-sided Pauli check can be considered as higher than error detection of a two-sided Pauli check. After all, in a two-sided Pauli check, readout errors on the set of data qubits 106 can be missed or can otherwise pass post-selection. In contrast, in a one-sided Pauli check, such readout errors can be considered as being part of the error 204 (e.g., as having occurred during execution of the Clifford circuit 110).

Note that the set of interleaved SWAP gates 602 can be implemented with respect to the set of nested, randomized one-sided Pauli checks 1102, just as described above with respect to the set of nested, randomized two-sided Pauli checks 202.

Figure 18:
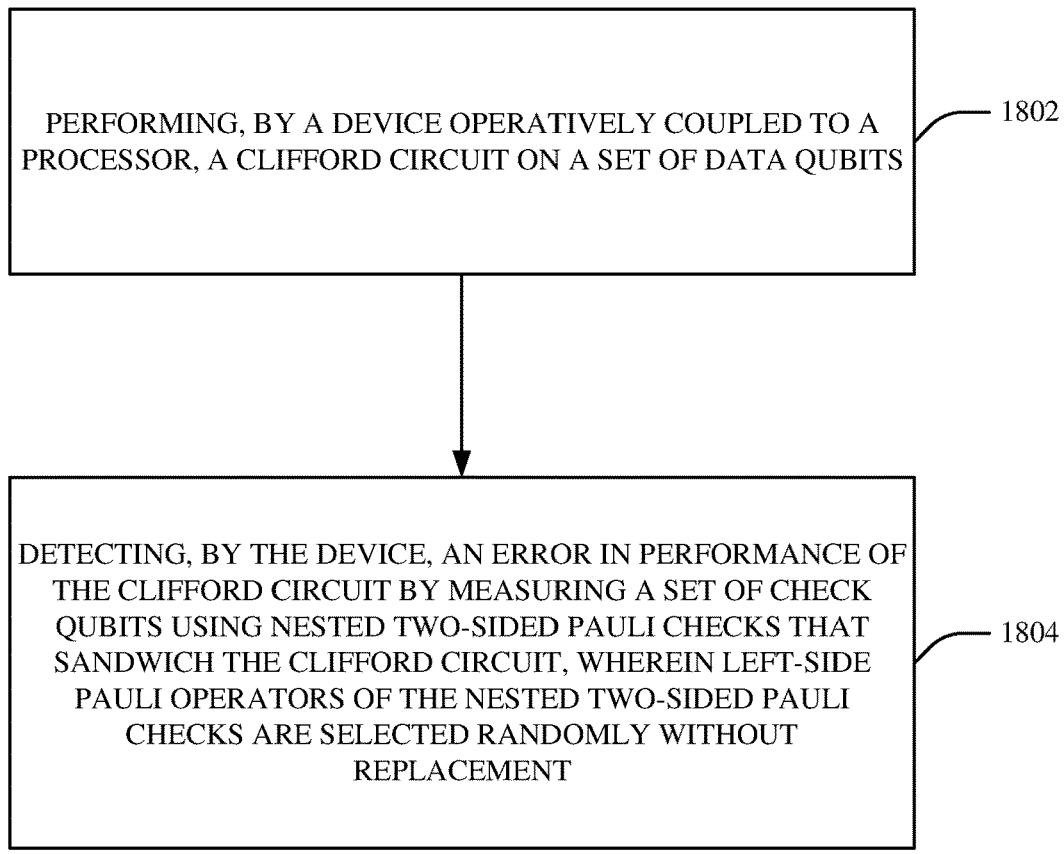
FIG. 18 illustrates a flow diagram of an example, non-limiting computer-implemented method that facilitates improved single-shot error mitigation for Clifford circuits via randomized two-sided Pauli checks in accordance with one or more embodiments described herein.

FIG. 18 illustrates a flow diagram of an example, non-limiting computer-implemented method 1800 that can facilitate improved single-shot error mitigation for Clifford circuits via randomized two-sided Pauli checks in accordance with one or more embodiments described herein. In various cases, the Pauli check system 102 can facilitate the computer-implemented method 1800.

In various embodiments, act 1802 can include performing, by a device (e.g., via 118) operatively coupled to a processor (e.g., 112), a Clifford circuit (e.g., 110) on a set of data qubits (e.g., 106).

In various aspects, act 1804 can include detecting, by the device (e.g., via 118), an error (e.g., 204) in performance of the Clifford circuit by measuring a set of check qubits (e.g., 108) using nested two-sided Pauli checks (e.g., 202) that sandwich the Clifford circuit. In various cases, left-side Pauli operators (e.g., $L_1$ to $L_m$) of the nested two-sided Pauli checks can be selected randomly without replacement (e.g., as described with respect to FIG. 3).

Although not explicitly shown in FIG. 18, right-side Pauli operators (e.g., $R_1$ to $R_m$) of the nested two-sided Pauli checks can be selected based on a commutation circuit identity relating respective ones of the left-side Pauli operators to the Clifford circuit (e.g., as described with respect to FIG. 3).

Although not explicitly shown in FIG. 18, the computer-implemented method 1800 can comprise: post-selecting, by the device (e.g., via 118) on a zero state (e.g., |0⟩ ) for each of the set of check qubits.

Although not explicitly shown in FIG. 18, the set of data qubits and the set of check qubits can be arranged in a linear nearest neighbor coupling topology, and the nested two-sided Pauli checks can contain interleaved SWAP gates (e.g., 602). In various instances, each controlled Pauli gate (e.g., $L_{1,1}$, $L_{1,2}$, $L_{1,3}$) of the nested two-sided Pauli checks can be followed by a respective one of the set of interleaved SWAP gates (e.g., as shown in FIG. 9).

Figure 19:
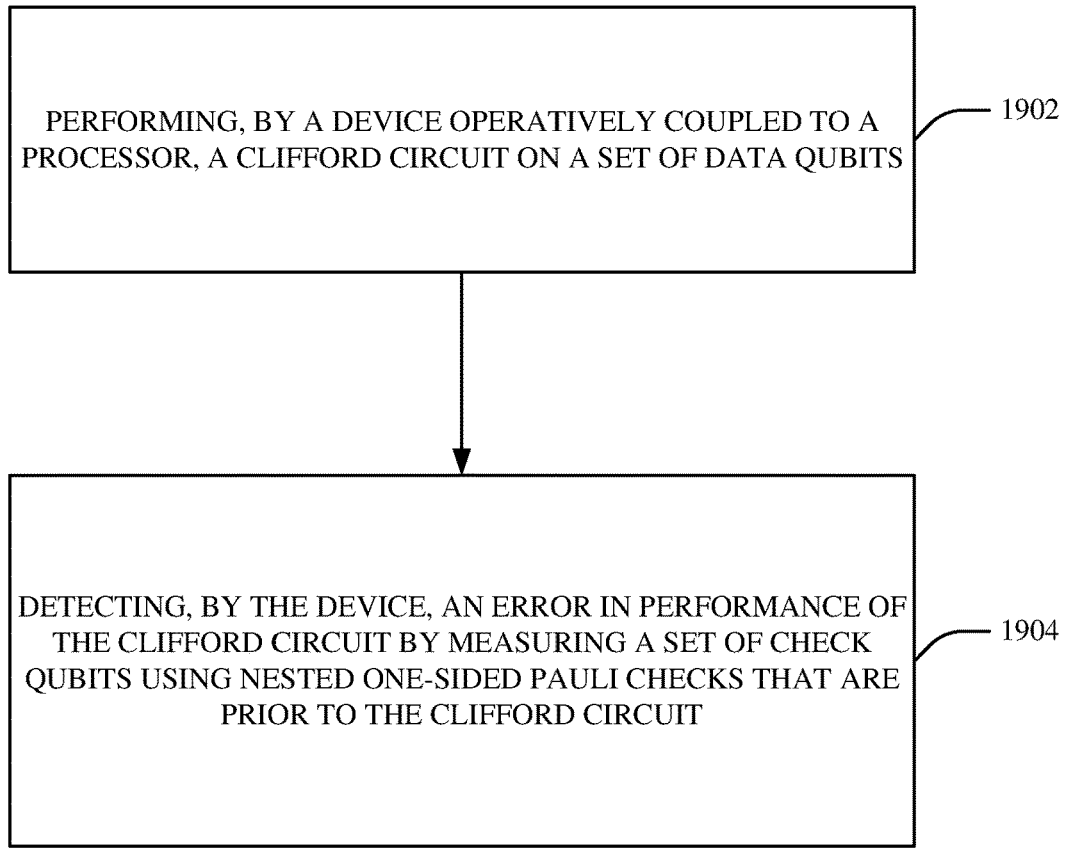
FIG. 19 illustrates a flow diagram of an example, non-limiting computer-implemented method that facilitates improved single-shot error mitigation for Clifford circuits via randomized one-sided Pauli checks in accordance with one or more embodiments described herein.

FIG. 19 illustrates a flow diagram of an example, non-limiting computer-implemented method 1900 that can facilitate improved single-shot error mitigation for Clifford circuits via randomized one-sided Pauli checks in accordance with one or more embodiments described herein. In various cases, the Pauli check system 102 can facilitate the computer-implemented method 1900.

In various embodiments, act 1902 can include performing, by a device (e.g., via 118) operatively coupled to a processor (e.g., 112), a Clifford circuit (e.g., 110) on a set of data qubits (e.g., 106).

In various aspects, act 1904 can include detecting, by the device (e.g., via 118), an error (e.g., 204) in performance of the Clifford circuit by measuring a set of check qubits (e.g., 108) using nested one-sided Pauli checks (e.g., 1102) that are prior to (e.g., leftward of) the Clifford circuit.

Although not explicitly shown in FIG. 19, the nested one-sided Pauli checks can be selected based on a commutation circuit identity relating the Clifford circuit to Z-type Pauli operators that are selected randomly without replacement (e.g., as described with respect to FIGS. 10-16).

Although not explicitly shown in FIG. 19, the device can measure, after execution of the Clifford circuit and without intervening operators, the set of data qubits, and the device can detect the error based on classically processing measured states (e.g., 1202, 1704) of the set of check qubits with measured states (e.g., 1204, 1702) of the set of data qubits. In various cases, the device can perform such classical processing via one or more Exclusive-OR Boolean operations.

Although not explicitly shown in FIG. 19, the set of data qubits and the set of check qubits can be arranged in a linear nearest neighbor coupling topology, and the nested one-sided Pauli checks can contain interleaved SWAP gates (e.g., 602).

Figure 20:
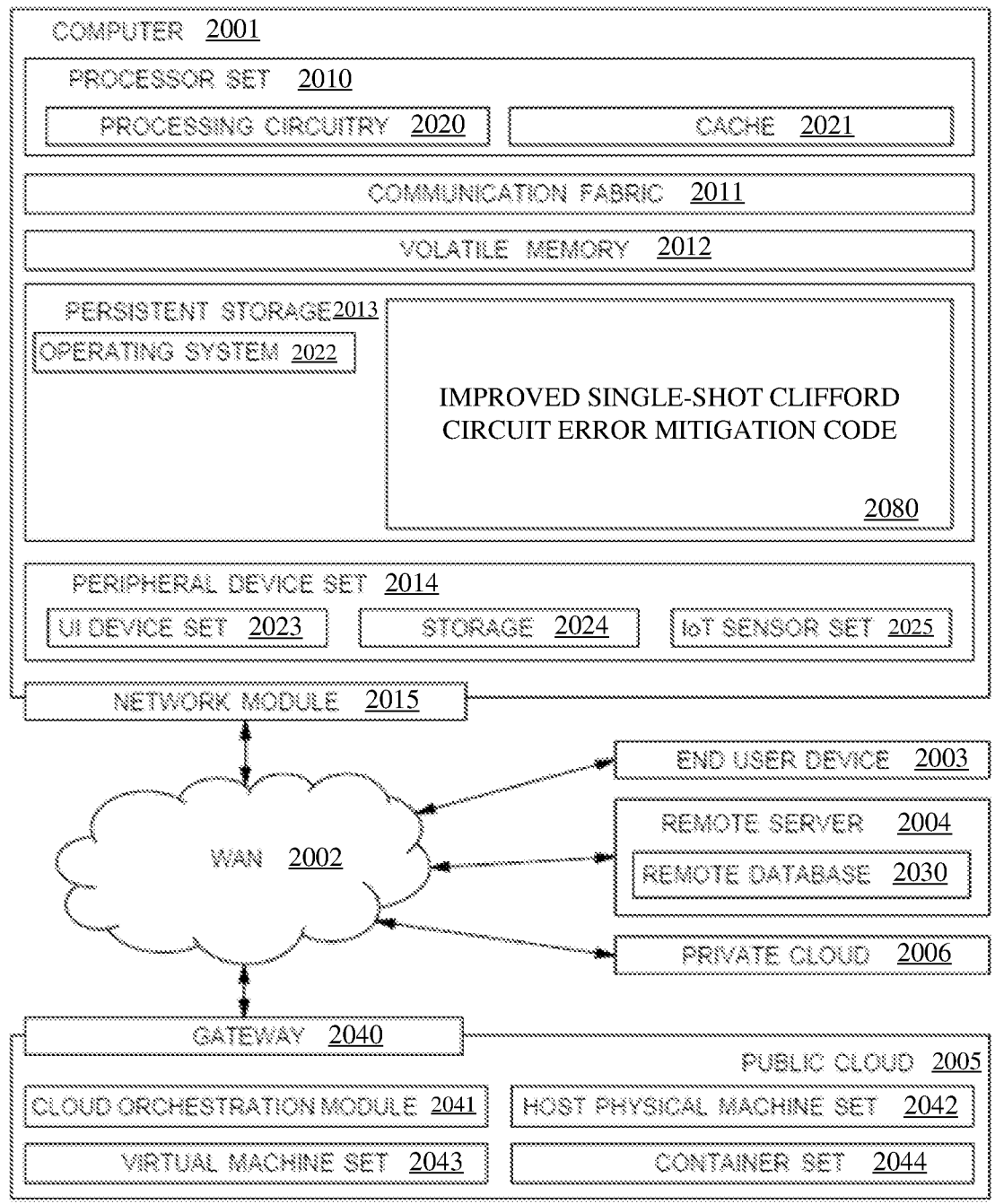
FIG. 20 illustrates a block diagram of an example, non-limiting operating environment in which one or more embodiments described herein can be facilitated.

FIG. 20 and the following discussion are intended to provide a brief, general description of a suitable computing environment 2000 in which one or more embodiments described herein can be implemented. For example, various aspects of the present disclosure are described by narrative text, flowcharts, block diagrams of computer systems or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 2000 contains an example of an environment for the execution of at least some of the computer code involved in performing the inventive methods, such as improved single-shot Clifford circuit error mitigation code 2080. In addition to block 2080, computing environment 2000 includes, for example, computer 2001, wide area network (WAN) 2002, end user device (EUD) 2003, remote server 2004, public cloud 2005, and private cloud 2006. In this embodiment, computer 2001 includes processor set 2010 (including processing circuitry 2020 and cache 2021), communication fabric 2011, volatile memory 2012, persistent storage 2013 (including operating system 2022 and block 2080, as identified above), peripheral device set 2014 (including user interface (UI), device set 2023, storage 2024, and Internet of Things (IoT) sensor set 2025), and network module 2015. Remote server 2004 includes remote database 2030. Public cloud 2005 includes gateway 2040, cloud orchestration module 2041, host physical machine set 2042, virtual machine set 2043, and container set 2044.

COMPUTER 2001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 2030. As is well understood in the art of computer technology, and depending upon the technology, performance of a computer-implemented method can be distributed among multiple computers or between multiple locations. On the other hand, in this presentation of computing environment 2000, detailed discussion is focused on a single computer, specifically computer 2001, to keep the presentation as simple as possible. Computer 2001 can be located in a cloud, even though it is not shown in a cloud in FIG. 20. On the other hand, computer 2001 is not required to be in a cloud except to any extent as can be affirmatively indicated.

PROCESSOR SET 2010 includes one, or more, computer processors of any type now known or to be developed in the future. Processing circuitry 2020 can be distributed over multiple packages, for example, multiple, coordinated integrated circuit chips. Processing circuitry 2020 can implement multiple processor threads or multiple processor cores. Cache 2021 is memory that is located in the processor chip package(s) and is typically used for data or code that should be available for rapid access by the threads or cores running on processor set 2010. Cache memories are typically organized into multiple levels depending upon relative proximity to the processing circuitry. Alternatively, some, or all, of the cache for the processor set can be located "off chip." In some computing environments, processor set 2010 can be designed for working with qubits and performing quantum computing.

Computer readable program instructions are typically loaded onto computer 2001 to cause a series of operational steps to be performed by processor set 2010 of computer 2001 and thereby effect a computer-implemented method, such that the instructions thus executed will instantiate the methods specified in flowcharts or narrative descriptions of computer-implemented methods included in this document (collectively referred to as "the inventive methods"). These computer readable program instructions are stored in various types of computer readable storage media, such as cache 2021 and the other storage media discussed below. The program instructions, and associated data, are accessed by processor set 2010 to control and direct performance of the inventive methods. In computing environment 2000, at least some of the instructions for performing the inventive methods can be stored in block 2080 in persistent storage 2013.

COMMUNICATION FABRIC 2011 is the signal conduction path that allows the various components of computer 2001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths or wireless communication paths.

VOLATILE MEMORY 2012 is any type of volatile memory now known or to be developed in the future. Examples include dynamic type random access memory (RAM) or static type RAM. Typically, the volatile memory is characterized by random access, but this is not required unless affirmatively indicated. In computer 2001, the volatile memory 2012 is located in a single package and is internal to computer 2001, but, alternatively or additionally, the volatile memory can be distributed over multiple packages or located externally with respect to computer 2001.

PERSISTENT STORAGE 2013 is any form of non-volatile storage for computers that is now known or to be developed in the future. The non-volatility of this storage means that the stored data is maintained regardless of whether power is being supplied to computer 2001 or directly to persistent storage 2013. Persistent storage 2013 can be a read only memory (ROM), but typically at least a portion of the persistent storage allows writing of data, deletion of data and re-writing of data. Some familiar forms of persistent storage include magnetic disks and solid-state storage devices. Operating system 2022 can take several forms, such as various known proprietary operating systems or open-source Portable Operating System Interface type operating systems that employ a kernel. The code included in block 2080 typically includes at least some of the computer code involved in performing the inventive methods.

PERIPHERAL DEVICE SET 2014 includes the set of peripheral devices of computer 2001. Data communication connections between the peripheral devices and the other components of computer 2001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 2023 can include components such as a display screen, speaker, microphone, wearable devices (such as goggles and smart watches), keyboard, mouse, printer, touchpad, game controllers, and haptic devices. Storage 2024 is external storage, such as an external hard drive, or insertable storage, such as an SD card. Storage 2024 can be persistent or volatile. In some embodiments, storage 2024 can take the form of a quantum computing storage device for storing data in the form of qubits. In embodiments where computer 2001 is required to have a large amount of storage (for example, where computer 2001 locally stores and manages a large database) then this storage can be provided by peripheral storage devices designed for storing large amounts of data, such as a storage area network (SAN) that is shared by multiple, geographically distributed computers. IoT sensor set 2025 is made up of sensors that can be used in Internet of Things applications. For example, one sensor can be a thermometer and another sensor can be a motion detector.

NETWORK MODULE 2015 is the collection of computer software, hardware, and firmware that allows computer 2001 to communicate with other computers through WAN 2002. Network module 2015 can include hardware, such as modems or Wi-Fi signal transceivers, software for packetizing or de-packetizing data for communication network transmission, or web browser software for communicating data over the internet. In some embodiments, network control functions and network forwarding functions of network module 2015 are performed on the same physical hardware device. In other embodiments (for example, embodiments that utilize software-defined networking (SDN)), the control functions and the forwarding functions of network module 2015 are performed on physically separate devices, such that the control functions manage several different network hardware devices. Computer readable program instructions for performing the inventive methods can typically be downloaded to computer 2001 from an external computer or external storage device through a network adapter card or network interface included in network module 2015.

WAN 2002 is any wide area network (for example, the internet) capable of communicating computer data over non-local distances by any technology for communicating computer data, now known or to be developed in the future. In some embodiments, the WAN can be replaced or supplemented by local area networks (LANs) designed to communicate data between devices located in a local area, such as a Wi-Fi network. The WAN or LANs typically include computer hardware such as copper transmission cables, optical transmission fibers, wireless transmission, routers, firewalls, switches, gateway computers and edge servers.

END USER DEVICE (EUD) 2003 is any computer system that is used and controlled by an end user (for example, a customer of an enterprise that operates computer 2001) and can take any of the forms discussed above in connection with computer 2001. EUD 2003 typically receives helpful and useful data from the operations of computer 2001. For example, in a hypothetical case where computer 2001 is designed to provide a recommendation to an end user, this recommendation would typically be communicated from network module 2015 of computer 2001 through WAN 2002 to EUD 2003. In this way, EUD 2003 can display, or otherwise present, the recommendation to an end user. In some embodiments, EUD 2003 can be a client device, such as thin client, heavy client, mainframe computer or desktop computer.

REMOTE SERVER 2004 is any computer system that serves at least some data or functionality to computer 2001. Remote server 2004 can be controlled and used by the same entity that operates computer 2001. Remote server 2004 represents the machine(s) that collect and store helpful and useful data for use by other computers, such as computer 2001. For example, in a hypothetical case where computer 2001 is designed and programmed to provide a recommendation based on historical data, then this historical data can be provided to computer 2001 from remote database 2030 of remote server 2004.

PUBLIC CLOUD 2005 is any computer system available for use by multiple entities that provides on-demand availability of computer system resources or other computer capabilities, especially data storage (cloud storage) and computing power, without direct active management by the scale. The direct and active management of the computing resources of public cloud 2005 is performed by the computer hardware or software of cloud orchestration module 2041. The computing resources provided by public cloud 2005 are typically implemented by virtual computing environments that run on various computers making up the computers of host physical machine set 2042, which is the universe of physical computers in or available to public cloud 2005. The virtual computing environments (VCEs) typically take the form of virtual machines from virtual machine set 2043 or containers from container set 2044. It is understood that these VCEs can be stored as images and can be transferred among and between the various physical machine hosts, either as images or after instantiation of the VCE. Cloud orchestration module 2041 manages the transfer and storage of images, deploys new instantiations of VCEs and manages active instantiations of VCE deployments. Gateway 2040 is the collection of computer software, hardware and firmware allowing public cloud 2005 to communicate through WAN 2002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 2006 is similar to public cloud 2005, except that the computing resources are only available for use by a single enterprise. While private cloud 2006 is depicted as being in communication with WAN 2002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, or data/application portability between the multiple constituent clouds. In this embodiment, public cloud 2005 and private cloud 2006 are both part of a larger hybrid cloud.

The herein disclosure describes non-limiting examples of various embodiments. For ease of description or explanation, various portions of the herein disclosure utilize the term "each", "every", or "all" when discussing various embodiments. Such usages of the term "each", "every", or "all" are non-limiting examples. In other words, when the herein disclosure provides a description that is applied to "each", "every", or "all" of some particular object or component, it should be understood that this is a non-limiting example of various embodiments, and it should be further understood that, in various other embodiments, it can be the case that such description applies to fewer than "each", "every", or "all" of that particular object or component.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on a computer, partly on a computer, as a stand-alone software package, partly on a computer or partly on a remote computer or entirely on the remote computer or server. In the latter scenario, the remote computer can be connected to a computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general-purpose computer, special purpose computer or other programmable data processing apparatus to produce a machine, such that the instructions, which execute via the processor of the computer or other programmable data processing apparatus, can create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein can comprise an article of manufacture including instructions which can implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality or operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams or flowchart illustration, or combinations of blocks in the block diagrams or flowchart illustration, can be implemented by special purpose hardware-based systems that can perform the specified functions or acts or carry out one or more combinations of special purpose hardware or computer instructions.

While the subject matter has been described above in the general context of computer-executable instructions of a computer program product that runs on a computer or computers, those skilled in the art will recognize that the one or more embodiments herein also can be implemented at least partially in parallel with one or more other program modules. Generally, program modules include routines, programs, components or data structures that perform particular tasks or implement particular abstract data types. Moreover, the aforedescribed computer-implemented methods can be practiced with other computer system configurations, including single-processor or multiprocessor computer systems, mini-computing devices, mainframe computers, as well as computers, hand-held computing devices (e.g., PDA, phone), or microprocessor-based or programmable consumer or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" or "interface" can refer to or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter described herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches or gates, in order to optimize space usage or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Also, the described memory components of systems or computer-implemented methods herein are intended to include, without being limited to including, these or any other suitable types of memory.

What has been described above includes mere examples of systems and computer-implemented methods. It is, of course, not possible to describe every conceivable combination of components or computer-implemented methods for purposes of describing the one or more embodiments, but one of ordinary skill in the art can recognize that many further combinations or permutations of the one or more embodiments are possible. Furthermore, to the extent that the terms "includes," "has," "possesses," and the like are used in the detailed description, claims, appendices or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising:
    a processor that executes computer-executable instructions stored in a non-transitory computer-readable memory, which causes a processor to facilitate operations comprising:
        performing a Clifford circuit on a set of data qubits; and
        detecting an error in performance of the Clifford circuit by measuring a set of check qubits using nested two-sided Pauli checks that sandwich the Clifford circuit, wherein left-side Pauli operators of the nested two-sided Pauli checks are selected randomly without replacement, wherein right-side Pauli operators of the nested two-sided Pauli checks are selected based on a commutation circuit identity relating respective ones of the left-side Pauli operators to the Clifford circuit.

2. The system of claim 1, wherein the operations further comprise:
    post-selecting on a zero state for each of the set of check qubits.

3. The system of claim 1, wherein the set of data qubits and the set of check qubits are arranged in a linear nearest neighbor coupling topology, and wherein the nested two-sided Pauli checks contain interleaved SWAP gates.

4. The system of claim 3, wherein each controlled Pauli gate of the nested two-sided Pauli checks is followed by a respective one of the set of interleaved SWAP gates.

5. A computer-implemented method, comprising:
    performing, by a device operatively coupled to a processor, a Clifford circuit on a set of data qubits; and
    detecting, by the device, an error in performance of the Clifford circuit by measuring a set of check qubits using nested two-sided Pauli checks that sandwich the Clifford circuit, wherein left-side Pauli operators of the nested two-sided Pauli checks are selected randomly without replacement, wherein right-side Pauli operators of the nested two-sided Pauli checks are selected based on a commutation circuit identity relating respective ones of the left-side Pauli operators to the Clifford circuit.

6. The computer-implemented method of claim 5, further comprising:
    post-selecting, by the device, on a zero state for each of the set of check qubits.

7. The computer-implemented method of claim 5, wherein the set of data qubits and the set of check qubits are arranged in a linear nearest neighbor coupling topology, and wherein the nested two-sided Pauli checks contain interleaved SWAP gates.

8. The computer-implemented method of claim 7, wherein each controlled Pauli gate of the nested two-sided Pauli checks is followed by a respective one of the set of interleaved SWAP gates.

9. A computer program product for facilitating improved single-shot error mitigation for Clifford circuits, the computer program product comprising a non-transitory computer-readable memory having program instructions embodied therewith, the program instructions executable by a processor to cause the processor to:

perform a Clifford circuit on a set of data qubits; and detect an error in performance of the Clifford circuit by measuring a set of check qubits using nested two-sided Pauli checks that sandwich the Clifford circuit, wherein left-side Pauli operators of the nested two-sided Pauli checks are selected randomly without replacement, wherein right-side Pauli operators of the nested two-sided Pauli checks are selected based on a commutation circuit identity relating respective ones of the left-side Pauli operators to the Clifford circuit.

10. The computer program product of claim 9, wherein the processor post-selects on a zero state for each of the set of check qubits.

11. The computer program product of claim 9, wherein the set of data qubits and the set of check qubits are arranged in a linear nearest neighbor coupling topology, and wherein the nested two-sided Pauli checks contain interleaved SWAP gates.

12. The computer program product of claim 11, wherein each controlled Pauli gate of the nested two-sided Pauli checks is followed by a respective one of the set of interleaved SWAP gates.

13. A system, comprising:

a processor that executes computer-executable instructions stored in a non-transitory computer-readable memory, which causes the processor to facilitate operations comprising:

performing a Clifford circuit on a set of data qubits; and detecting an error in performance of the Clifford circuit by measuring a set of check qubits using nested one-sided Pauli checks that are prior to the Clifford circuit, wherein the nested one-sided Pauli checks are selected based on a commutation circuit identity relating the Clifford circuit to Z-type Pauli operators that are selected randomly without replacement.

14. The system of claim 13, wherein the operations further comprise:

measuring, after execution of the Clifford circuit and without intervening operators, the set of data qubits, and wherein the detecting the error is based on classically processing measured states of the set of check qubits with measured states of the set of data qubits.

15. The system of claim 14, wherein the detection component performs such classical processing via one or more Exclusive-OR Boolean operations.

16. The system of claim 13, wherein the set of data qubits and the set of check qubits are arranged in a linear nearest neighbor coupling topology, and wherein the nested one-sided Pauli checks contain interleaved SWAP gates.

17. A computer-implemented method, comprising:

performing, by a device operatively coupled to a processor, a Clifford circuit on a set of data qubits; and detecting, by the device, an error in performance of the Clifford circuit by measuring a set of check qubits using nested one-sided Pauli checks that are prior to the Clifford circuit, wherein the nested one-sided Pauli checks are selected based on a commutation circuit identity relating the Clifford circuit to Z-type Pauli operators that are selected randomly without replacement.

18. The computer-implemented method of claim 17, wherein the device measures, after execution of the Clifford circuit and without intervening operators, the set of data qubits, and wherein the device detects the error based on classically processing measured states of the set of check qubits with measured states of the set of data qubits.

19. The computer-implemented method of claim 18, wherein the device performs such classical processing via one or more Exclusive-OR Boolean operations.

20. The computer-implemented method of claim 17, wherein the set of data qubits and the set of check qubits are arranged in a linear nearest neighbor coupling topology, and wherein the nested one-sided Pauli checks contain interleaved SWAP gates.

* * * * *